US010546587B2

(12) United States Patent
Chakladar et al.

(10) Patent No.: US 10,546,587 B2
(45) Date of Patent: Jan. 28, 2020

(54) ELECTRONIC DEVICE AND METHOD FOR SPOKEN INTERACTION THEREOF

(71) Applicant: Samsung Electronics Co., Ltd., Gyeonggi-do (KR)

(72) Inventors: Subhojit Chakladar, Suwon-si (KR); Sanghoon Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/883,489

(22) Filed: Oct. 14, 2015

(65) Prior Publication Data

US 2016/0104484 A1    Apr. 14, 2016

(30) Foreign Application Priority Data

Oct. 14, 2014  (KR) ........................ 10-2014-0138548

(51) Int. Cl.
*G10L 15/26* (2006.01)
*G06F 17/27* (2006.01)
*G10L 15/22* (2006.01)

(52) U.S. Cl.
CPC .......... *G10L 15/26* (2013.01); *G06F 17/2775* (2013.01); *G06F 17/2785* (2013.01); *G10L 15/22* (2013.01)

(58) Field of Classification Search
CPC ......... G10L 15/30; G10L 15/22; G10L 15/26; G10L 15/32
See application file for complete search history.

(56) References Cited

U.S. PATENT DOCUMENTS

| 8,346,543 | B2 | 1/2013 | Chen et al. | |
| 8,543,397 | B1 | 9/2013 | Nguyen | |
| 8,706,505 | B1* | 4/2014 | Bringert | G10L 15/22 704/275 |
| 2009/0177461 | A1* | 7/2009 | Ehsani | G06F 17/289 704/2 |
| 2011/0066634 | A1* | 3/2011 | Phillips | G10L 15/22 707/769 |
| 2011/0184740 | A1* | 7/2011 | Gruenstein | G10L 15/32 704/275 |

(Continued)

FOREIGN PATENT DOCUMENTS

| CN | 102792320 A | 11/2012 |
| CN | 103729126 A | 4/2014 |
| WO | 2013/056343 A1 | 4/2013 |

OTHER PUBLICATIONS

Office Action dated Sep. 29, 2019 in connection with Chinese Patent Application No. 201580055978.0, 28 pages.

*Primary Examiner* — Richemond Dorvil
*Assistant Examiner* — Mark Villena

(57) ABSTRACT

A method of operating an electronic device is provided, the method including: receiving, by the electronic device that includes a display and a voice receiving device, a sequence of speech elements through the voice receiving device; displaying, on the display by the electronic device, first information that is based on at least a part of a first speech element out of the speech elements; and displaying, on the display by the electronic device, second information, which is different than the first information and is based on at least a part of a second speech element that is received later than the first speech element among the speech elements.

14 Claims, 19 Drawing Sheets

(56) References Cited

U.S. PATENT DOCUMENTS

| | | |
|---|---|---|
| 2011/0208520 A1 | 8/2011 | Lee |
| 2012/0016678 A1 | 1/2012 | Gruber et al. |
| 2012/0084079 A1* | 4/2012 | Gruenstein ............. G10L 15/32 704/201 |
| 2012/0173245 A1* | 7/2012 | Miyahara ........... G01C 21/3617 704/275 |
| 2012/0232896 A1 | 9/2012 | Taleb et al. |
| 2012/0265528 A1* | 10/2012 | Gruber .................... G10L 15/18 704/235 |
| 2013/0035942 A1* | 2/2013 | Kim ........................ G06F 3/167 704/275 |
| 2013/0322665 A1* | 12/2013 | Bennett ............ G08G 1/096855 381/300 |
| 2013/0325481 A1* | 12/2013 | van Os ................... G10L 21/00 704/275 |
| 2014/0195243 A1* | 7/2014 | Cha ........................ G06F 3/167 704/270.1 |
| 2014/0316776 A1* | 10/2014 | Lee ........................ G10L 15/22 704/231 |
| 2015/0040012 A1* | 2/2015 | Faaborg ................. G10L 15/22 715/728 |
| 2015/0248886 A1* | 9/2015 | Sarikaya ............. G06F 16/3329 704/257 |
| 2015/0269935 A1* | 9/2015 | Suessenguth ......... G06F 17/273 704/235 |
| 2016/0035352 A1* | 2/2016 | Furumoto .......... G01C 21/3608 704/276 |
| 2016/0179787 A1* | 6/2016 | Deleeuw ............. G06F 17/2785 704/9 |

\* cited by examiner

ELECTRONIC DEVICE AND METHOD FOR SPOKEN INTERACTION THEREOF

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2014-0138548, filed on Oct. 14, 2014, which is hereby incorporated by reference for all purposes as if fully set forth herein.

TECHNICAL FIELD

The present disclosure relates to an electronic device and a method for a spoken interaction.

BACKGROUND

As computer sciences have developed, electronic devices have become deeply involved in people's lives. An electronic device has been developed to understand the words of humans, in addition to merely receiving a command from humans. A technique that enables an electronic device to understand, generate, and analyze sentences of humans is referred to as Natural Language Processing technique.

From the development of smart phones, an interaction between humans and electronic devices has become an increasingly more important issue. One technique that draws attention is a spoken interaction function. The spoken interaction function enables an electronic device to recognize the intention of a user included in a voice input when the user provides the voice input through an interface with the electronic device, and to provide a response thereto through the interface. After recognition of a text from the voice input, the natural language processing technique may be applied to recognize the user's intention from the recognized text.

SUMMARY

A complete sentence is required to enable a computer to execute a natural language processing technique. Also, only after a sentence is generated by converting a user voice input into a text format, a spoken interaction function may recognize the user's intention using the complete sentence.

As described above, the natural language processing technique is executed based on a complete sentence when the sentence is completed, and thus, there may be a waiting time until the sentence is provided. Additionally, when the sentence is long or complex, the natural language processing time may be longer since the sentence should be analyzed or processed at once. When the user uses the spoken interaction function, the delay time may occur.

In a first embodiment, a method for operating an electronic device is provided. The method includes receiving, by the electronic device that includes a display and a voice receiving device, a sequence of speech elements through the voice receiving device. The method further includes displaying, on the display by the electronic device, first information. The first information is associated with at least a part of a first speech element out of the speech elements. The method further includes displaying second information. The second information is different than the first information. The second information is associated with at least a part of a second speech element that has been received after the first speech element.

In a second embodiment, an electronic device is provided. The electronic device includes a display. The display is configured to display first information that is associated with at least a part of a first speech element out of the speech elements. The display is further configured to display second information that is associated with at least a part of a second speech element that has been received after the first speech element. The electronic device further includes a voice receiving device. The voice receiving device is configured to receive a sequence of speech elements through the voice receiving device. The electronic device further includes a communication module. The electronic device further includes a memory. The electronic device further includes a processor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
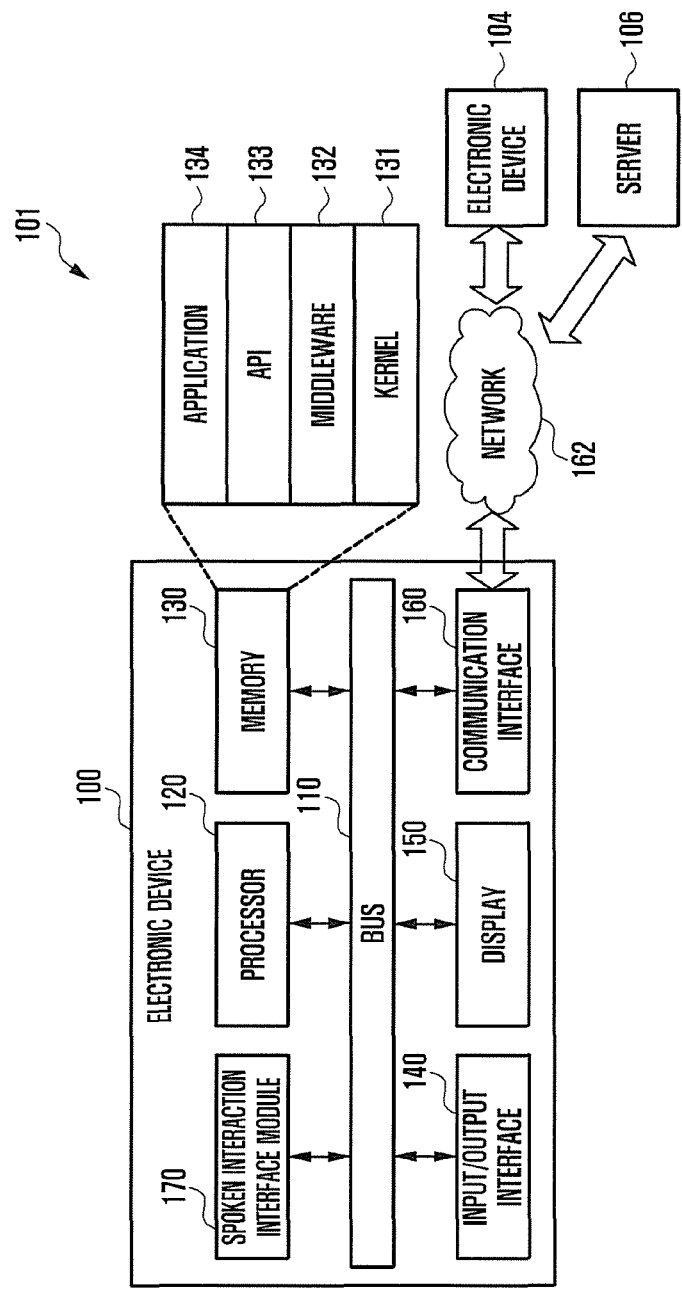
FIG. 1 is a diagram illustrating an example configuration of a network environment according to this disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, exemplary embodiments of the present disclosure are described in detail with reference to the accompanying drawings. While the present disclosure may have various embodiments, and modifications and changes may be made therein. Therefore, the present invention will be described in detail with reference to particular embodiments shown in the accompanying drawings. However, it should be understood that there is no intent to limit the present disclosure to the particular forms, and the present disclosure should be construed to cover all modifications, equivalents, and/or alternatives falling within the spirit and scope of the present disclosure. In describing the drawings, similar elements are designated by similar reference numerals.

As used in the present disclosure, the expression "include" or "may include" refers to the existence of a corresponding function, operation, or constituent element, and does not limit one or more additional functions, operations, or constituent elements. Further, as used in the present disclosure, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present disclosure, the expression "or" includes any or all combinations of words enumerated together. For example, the expression "A or B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present invention are merely for the purpose of describing particular embodiments and are not intended to limit the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device can be a device including a communication function. For example, the electronic device can include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (such as a head-mounted-device (HMD) such as electronic glasses, electronic clothes, an electronic bracelet, an electronic necklace, an electronic accessory, electronic tattoos, or a smartwatch).

The electronic device can be a smart home appliance with a communication function. The smart home appliance as the electronic device, for example, can include at least one of a television, a digital video disk (DVD) player, an audio, a refrigerator, an air conditioner, a vacuum cleaner, an oven, a microwave oven, a washing machine, an air cleaner, a set-top box, a TV box (such as SAMSUNG HOMESYNC™, APPLE TV™, GOOGLETV™, or the like), a game console, an electronic dictionary, an electronic key, a camcorder, and an electronic photo frame.

The electronic devices can include at least one of various medical devices (such as magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an automotive infotainment device, electronic equipment for ships (such as ship navigation equipment and a gyrocompass), avionics, security equipment, a vehicle head unit, an industrial or home robot, an automatic teller machine (ATM) of a banking system, and a point of sales (POS) in a shop.

The electronic device can include at least one of a part of furniture or a building/structure, an electronic board, an electronic signature receiving device, a projector, and various kinds of measuring instruments (such as a water meter, an electric meter, a gas meter, and a radio wave meter). The electronic device according to the present disclosure can be a combination of one or more of the aforementioned various devices. Further, the electronic device according to the present disclosure can be a flexible device. Further, it will be apparent to those skilled in the art that the electronic device according to the present disclosure is not limited to the aforementioned devices.

Hereinafter, an electronic device according to this disclosure will be discussed with reference to the accompanying drawings. The term "a user" as used in various embodiments may refer to any person who uses an electronic device or any other device (e.g., an artificial intelligence electronic device) using an electronic device.

FIG. 1 is a block diagram illustrating an example configuration of a network environment 100 including an electronic device 101 according to this disclosure. As illustrated in FIG. 1, the electronic device 101 include a bus 110, a processor 120, a memory 130, an input/output interface 140, a display 150, a communication interface 160, and a spoken interaction interface module 170.

The bus 110 is a circuit interconnecting the aforementioned components and transmitting communication (such as a control message) between the aforementioned components.

The processor 120 for example receives instructions from the aforementioned components (such as the memory 130, the input/output interface 140, the display 150, the communication interface 160, and the spoken interaction interface module 170) other than the processor 120 through the bus 110, decodes the received instructions, and performs operations or data processing according to decoded instructions.

The memory 130 stores instructions or data received from or generated by the processor 120 or other components (such as the input/output interface 140, the display 150, the communication interface 160, and the spoken interaction interface module 170). The memory 130 includes programming modules comprising a kernel 131, middleware 132, an application programming interface (API) 133, and applications 134. Each of the programming modules are formed by software, firmware, hardware, or a combination of two or more thereof.

The kernel 131 controls or manages system resources (such as the bus 110, the processor 120, and the memory 130) used to execute operations or functions implemented in the remaining other programming modules comprising the middleware 132, the API 133, and the applications 134. Furthermore, the kernel 131 provides an interface that allows the middleware 132, the API 133, or the applications 134 to access, control and/or manage individual components of the electronic device 101.

The middleware 132 controls the API 133, the applications 134, and the kernel 131 to communicate and exchange data among the API 133, the applications 134, and the kernel 131. Furthermore, the middleware 132 controls task requests (such as scheduling, load balancing, or the like received from the applications 134. For example, the middleware 132 provides a method for assigning a priority of system resources (such as the bus 110, the processor 120, or the memory 130 configured in the electronic device 101 to at least one of the applications 134.

The API 133 is an interface for allowing the applications 134 to control functions provided by the kernel 131 and the middleware 132, and includes at least one interface or function (such as instruction comprising a file control function, a window control function, an image processing function, or a text control function.

The application 134 includes an SMS/MMS application, an e-mail application, a calendar application, an alarm application, a health care application (such as an application for measuring an amount of exercise, blood glucose, or the like), and an environmental information application (such as an application for providing atmospheric pressure information, humidity information, temperature information, or the like). The application 134 further includes an application associated with information exchanged between the electronic device 101 and an external electronic device (such as the electronic device 104). The application associated with information exchange, for example, includes a notification relay application for transferring specific information to the external electronic device or a device management application for managing the external electronic device.

For example, the notification relay application includes a function of transferring notification information that is generated in another application of the electronic device 101 (such as the SMS/MMS application, the e-mail application, the health care application, the environmental information application, or the like), to an external electronic device (such as the electronic device 104). The notification relay application further receives notification information from an external electronic device (such as the electronic device 104) and provide the received notification information to a user. The device management application, for example manages a function (such as install, remove, update, or the like) for at least a part of an external electronic device (such as the electronic device 104) communicating with the electronic device 101 (such as a function of turning on/off an external electronic device itself (or some components thereof), adjusting the brightness (or resolution) of a display, or the like), an application running on the external electronic device, or a service provided in the external electronic device (such as, a calling, messaging service, or the like).

The application 134 includes an application in accordance with the attribute (such as type or the like) of an external electronic device (such as the electronic device 104). When the external electronic device is configured as an MP3 player, the application 134 includes an application associated with music playback. Similarly, when the external electronic device is configured as a mobile medical device, the application 134 includes an application associated with health care. The application 134 includes at least one of an application assigned to the electronic device 101 and an application received from an external electronic device (such as the server 106 or the electronic device 104).

The input/output interface 140, for example, transfers instructions or data, input from a user through an input/output device (such as a sensor, a keyboard, a touch screen, or the like), to the processor 120, the memory 130, the communication interface 160, or the spoken interaction interface module 170 through the bus 110. For example, the input/output interface 140 provides the processor 120 with data corresponding to a user's touch input through a touch screen. The input/output interface 140 further receives instructions or data from the processor 120, the memory 130, the communication interface 160, or the spoken interaction interface module 170 through the bus 110 and output the received instructions or data through the input/output device (such as a speaker, a display, or the like). For example, the input/output interface 140 further outputs voice data processed by the processor 120 to a user through a speaker.

The display 150 displays various type of information (such as multimedia data, text data, or the like) to a user.

The communication interface 160 establishes communication between the electronic device 101 and an external electronic device (such as the electronic device 104 or the server 106). The communication interface 160 is connected to the network 162 through a wireless or wired communication path, and then communicates the external device. A wireless communication, for example, includes at least one of wireless fidelity (WiFi), Bluetooth (BT), near field communication (NFC), a global positioning system (GPS), a cellular communication protocol (such as long-term evolution (LTE), LTE-advance (LTE-A), code division multiple access (CDMA), universal mobile telecommunications system (UMTS), wireless broadband (WiBro), global system for mobile communications (GSM), or the like), or a combination of thereof. A wired communication includes at least one of a universal serial bus (USB), a high definition multimedia interface (HDMI), recommended standard 232 (RS-232), a plain old telephone service (POTS), or a combination of thereof.

In certain embodiments, the network 162 is a telecommunications network including at least one of a computer network, the Internet, the Internet of things, a telephone network, or a combination of thereof. A protocol (such as a transport layer protocol, a data link layer protocol, a physical layer protocol, or the like) for a communication between the electronic device 101 and an external device is supported by at least one of the applications 134, the application programming interface 133, the middleware 132, the kernel 131, and the communication interface 160.

The spoken interaction interface module 170 processes at least an amount of information acquired from the other elements (such as the processor 120, the memory 130, the input/output interface 140, or the communication interface 160), and provides the processed information to a user through various methods. For example, the spoken interaction interface module 170 receives a voice input from the user, transmits information associated with the voice input to the server 106, and provides the user with a response to the voice input by receiving the response from the server 106.

In certain embodiments, the spoken interaction interface module 170 receives the voice input provided by the user, and transmits a corresponding voice signal or a text block obtained by converting the corresponding voice signal to the server 106 based on a streaming scheme. The server 106 estimates the user's intention using the voice signal or the converted text block that is associated with a streaming scheme, and generates an intermediate response based on the estimated user intention. The server 106 transmits the generated intermediate response to the electronic device 100. The spoken interaction interface module 170 executes and outputs the intermediate response received from the server 106. The server 106 corrects the intermediate response based on a voice signal or a converted text block that is subsequently provided within an identical sentence. The spoken interaction interface module 170 receives the corrected intermediate response from the server 106, and executes and outputs the same. The server 106 determines the user's intention using a voice signal or a converted text block that completes the corresponding sentence based on the estimated user's intention, and generates a final response based on the determined user's intention. The server 106 transmits the generated final response to the electronic device 100. The spoken interaction interface module 170 executes and outputs the final response received from the server 106. The server 106 corrects the final response based on a voice signal or a converted text block which supplements the completed sentence. The spoken interaction interface module 170 receives the corrected final response from the server 106, and executes and outputs the same.

Figure 2:
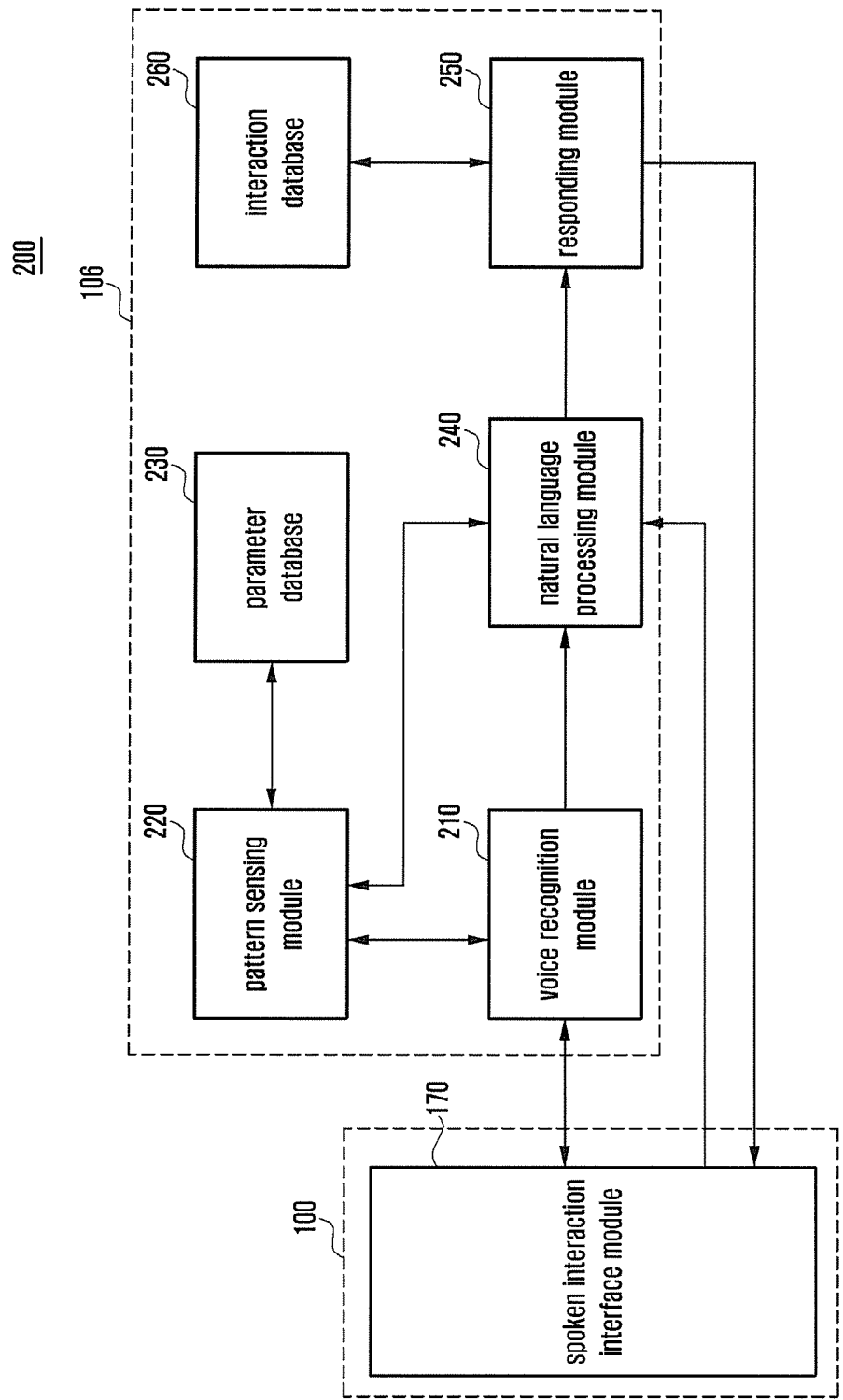
FIG. 2 is a block diagram illustrating an example configuration of a spoken interaction system according to this disclosure.

FIG. 2 is a block diagram illustrating an example configuration of a spoken interaction system 200 according to this disclosure. The spoken interaction system 200 includes the electronic device 100 and the server 106. When the electronic device 100 receives a voice input from a user and transmits the voice input to the server 106, the server 106 transmits a response associated with the user's intention included in the received voice input to the electronic device 100, and then the electronic device 100 executes the response and provides the response to the user.

The electronic device 100 includes the spoken interaction interface module 170. The server 106 includes a voice recognition module 210, a natural language processing module 240, a responding module 350, and an interaction database 260. The electronic device 100 further includes at least one of the voice recognition module 210, the natural language processing module 240, the responding module 250, the interaction database 260, or a combination of thereof as well as the spoken interaction interface module 170.

In certain embodiments, the spoken interaction interface module 170 included in the electronic device 100 receives a voice input from the user, and transfer the voice input to the voice recognition module 210 as a voice signal. The spoken interaction interface module 170 transfers the voice signal to the voice recognition module 210 based on a streaming scheme. The spoken interaction interface module 170 converts a voice signal into text information. In this instance, the spoken interaction interface module 170 transmits at least a text block converted from a voice signal to the server 106. The spoken interaction interface module 170 converting a voice signal into a text block is identical to an operation of the voice recognition module 210.

In certain embodiments, the spoken interaction interface module 170 receives an intermediate response or a final response in response to a voice input from the responding module 250, and then executes and outputs the intermediate response or the final response to the user. The spoken interaction interface module 170 exchanges data with the voice recognition module 210 and the responding module 250.

In certain embodiments, when a voice signal is received from the electronic device 100, the voice recognition module 210 included in the server 106 converts the received voice signal into text information. The voice recognition module 210 converts a received voice signal into text information based on a streaming scheme. The voice recognition based on the streaming scheme is executed based on an acoustic block unit. For example, the voice recognition includes operations of predicting phonemic information from a voice signal based on characteristics of a phoneme using an acoustic model, and taking the phonemic information together with a text prediction result obtained through a language model to complete text that is grammatically appropriate. The completed text includes a plurality of text blocks that is a set of at least one word.

In certain embodiments, the natural language processing module 240 recognizes the meaning using text included in at least one text block that is received from the voice recognition module 210 or the electronic device 100 based on a streaming scheme. The natural language processing module 240 recognizes the meaning of a sentence including at least one text block. The natural language processing module 240 estimates the user's intention using a keyword included in a few received text blocks. The operation of estimating the user's intention includes determining a type or a subject of a sentence. The natural language processing module 240 transmits the estimated user's intention to the responding module 250. The natural language processing module 240 recognizes the meaning of a corresponding sentence using a keyword included in successively received text blocks of the corresponding sentence. The natural language processing module 240 handles the text included in the received text blocks forming the corresponding sentence in order to recognize the meaning of the corresponding sentence. When the natural language processing module 240 recognizes the meaning of the sentence, the natural language processing module 240 indicates that the "user's intention" is determined based on the estimated user's intention. Hereinafter, when the natural language processing module 240 completes recognizing the meaning of a sentence, the natural language processing module 240 is indicated through the expression of "the user's intention is determined." The natural language processing module 240 transmits the determined user's intention to the responding module 250.

In certain embodiments, the natural language processing module 240 predicts a range of keywords required for determining the user's intention based on the estimated user's intention. The natural language processing module 240 determines whether a keyword that corresponds to the predicted range of keywords is included in the successively received text blocks. The natural language processing module 240 further determines whether the keyword that corresponds to the predicted range of keywords is included in the successively received text blocks, and determines the user's intention using the determined keyword. The natural language processing module 240 handles the text that is included in the received text blocks corresponding sentence in order to determine the user's intention.

In certain embodiments, the responding module 250 generates an intermediate response corresponding to the user's intention estimated in the natural language processing module 240, and generates a final response corresponding to the determined user's intention. The interaction database 260 stores a database associated with a response to the user's intention. The responding module 250 searches the interaction database 260 for an intermediate response corresponding to the estimated user's intention and provides the retrieved intermediate response, and searches for a final response corresponding to the determined user's intention, and then provide the final response. The intermediate response for example, is a provision of at least one piece of application information associated with the estimated user's intention. The final response is for example simple provision of information such as a simple response to the determined user's intention, or is a provision of application function execution information, editing or configuration command information. A response provided by the responding module 250 is not limited to the examples. The spoken interaction interface module 170 of the electronic device 100 receives an intermediate response and a final response from the responding module 250, and executes the same.

The spoken interaction system 200 further includes, for example a pattern sensing module 220 and a parameter database 230.

In certain embodiments, the pattern sensing module 220 senses a voice input pattern of the user and generates various type of parameters. The pattern sensing module 220 senses a voice input pattern of the user using a voice signal associated with the user voice input or converted text information. One of generated parameters is an articulation speed. The articulation speed is measured based on an average number of words per second, an average number of words per sentence, an average number of sub-sentences within a sentence, an average number of words per sub-sentence, or the like. The parameters are a pattern of words, a sentence that is generally used, or a pause pattern in speaking. The pause pattern includes a short pause pattern between words, a long pause pattern between sub-sentences, or the like.

In certain embodiments, the parameters are stored in the parameter database 230. Whenever a spoken interaction is executed between the user and the spoken interaction system 200, a parameter is updated.

In certain embodiments, the spoken interaction system 200 predicts, in advance, a user's voice input pattern to be received, based on a voice input pattern of the user that is stored as a parameter. For example, the natural language processing module 240 determines whether the user completes a sentence or pauses for a moment, based on parameter information. For another example, when a pause in the received user's voice input is relatively longer than a stored voice input pattern, it is determined that the user completes the sentence. When the pause in the received user's voice input is relatively shorter, it is determined that the user pauses for a moment.

In certain embodiments, the spoken interaction system 200 corrects an error of a received user voice input based on a voice input pattern of the user that is stored as a parameter. For example, the natural language processing module 240 uses parameter information associated with a pattern of words or a sentence that the user generally uses, so as to determine whether a voice input provided from the user has an error. For example, when "bus stop" is incorrectly input as "bus stap." the natural language processing module 240 automatically corrects an error using a parameter when the error is detected. In another embodiment, when an error is detected and a word that is subsequently received do not include an error, the natural language processing module 240 corrects the word including the error with the subsequently received word.

Figure 3:
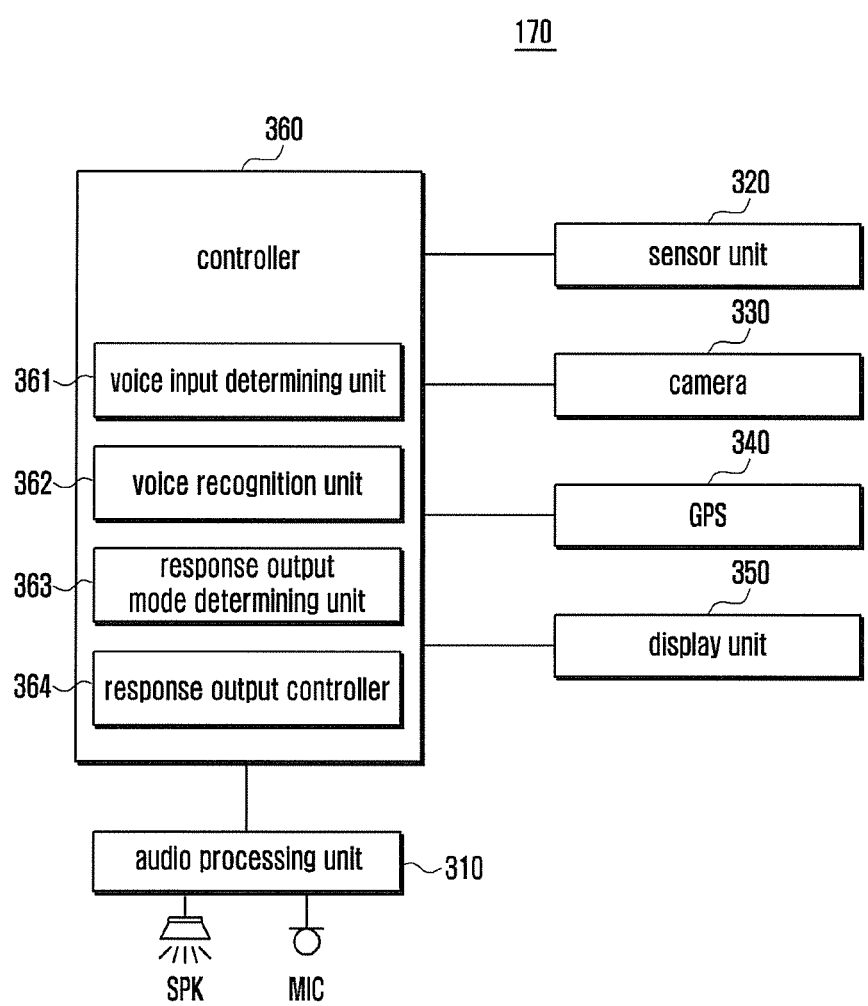
FIG. 3 is a block diagram illustrating an example configuration of a spoken interaction interface module according to this disclosure.

FIG. 3 is a block diagram illustrating an example configuration of a spoken interaction interface module 300 according to this disclosure.

The spoken interaction interface module 300 includes an audio processing unit 310, a sensor unit 320, a camera 330, a GPS 340, an output unit 350, and a controller 360.

In certain embodiments, the audio processing unit 310 is coupled with a speaker (SPK) and a microphone (MIC) to execute receiving voice, recording voice, digital recording, or inputting and outputting voice data for calling. The audio processing unit 310 receives an audio signal from the controller 360, digital-analog (D/A)-converts the received audio signal to an analog signal, amplifies the analog signal, and then outputs the analog signal to the SPK. The SPK converts an audio signal received from the audio processing unit 310 into a sound wave, and outputs the sound wave. When an intermediate response or a final response received from the responding module 250 is executed, an audio execution result is provided to the user through the SPK. The MIC converts sound waves transferred from a person or other sound sources into audio signals. The MIC receives a voice input from a user when a spoken interaction function is executed. The audio processing unit 310 performs A/D-converting that a voice signal received from the MIC is converted to a digital signal, and transmits the digital signal to the controller 360. When the spoken interaction function of the user is executed through the MIC, noise from an external environment is received together with the voice input. The audio processing unit 310 further includes the input/output interface 140 of FIG. 1.

In certain embodiments, the sensor unit 320 senses a position of the electronic device 100 of the user. For example, the sensor unit 320 senses a motion of putting the electronic device 100 close to the face or the mouth, therefore the user inputs voice. The sensor unit 320 senses a motion of removing the electronic device 100 from the face or the mouth, therefore the user terminates inputting voice. The sensor unit 320 further includes a gyro sensor or a proximity sensor.

In certain embodiments, the camera 330 executes a function of capturing an image or video. When the user puts the electronic device 100 close to the face or the mouth to input voice, the camera 330 detects the face or the mouth of the user from an obtained image. Subsequently, when the user removes the electronic device 100 from the face or the mouth to terminate inputting voice, the face or the mouth of the user is not detected any longer from the obtained image.

In certain embodiments, the GPS 340 traces the position of the electronic device 100. Therefore, a position or a movement of a user carrying the electronic device 100 is detected on the GPS 340.

In certain embodiments, the display unit 350 displays various type of information under the control of the controller 360. The display unit 350 displays a notification indicating an execution of a spoken interaction function when the spoken interaction function is executed, and displays a notification indicating the reception of a voice input when the voice input of the user is received. When the voice input of the user is received, the display unit 350 outputs a text corresponding to sequentially received voice inputs. The display unit 350 provides a visual execution result to a user when an intermediate response or a final response that is received from the responding module 250 is executed. The display unit 350 is formed as a liquid crystal display (LCD), an active matrix organic light emitted diode (AMOLED), a flexible display, a transparent display, or the like. For example, the display unit 350 includes the display 150 of FIG. 1.

The controller 360 controls a spoken interaction function. For example, the controller 360 operates independently from or in parallel with the processor 120 of FIG. 1. The controller 360 sequentially converts voice inputs that are successively received from the user into voice signals. In certain embodiments, the controller 360 sequentially converts the generated sound signals into text blocks. The controller 360 transmits a voice signal or a converted text block to the server 106. The controller 360 executes an intermediate response and a final response that is received from the server 106.

The controller 360 includes a voice input determining unit 361, a voice recognition unit 362, a response output mode determining unit 363, and a response output controller 364.

In certain embodiments, the voice input determining unit 361 determines whether to begin or terminate a reception of a voice input. For example, the voice input determining unit 361 begins to receive a voice input when the sensor unit 320 senses a motion of putting the electronic device 100 close to the face or the mouth. The controller 361 executes a spoken interaction function together with beginning the reception of a voice input. When the sensor unit 320 senses a user's motion of removing the electronic device 100 from the face or the mouth, the controller 361 terminates the reception of a voice input. Also, the voice input determining unit 361 begins to receive a voice input when the face or the mouth of the user is detected from an image obtained from the camera 330. The controller 360 further executes a spoken interaction function based on (together with) beginning the reception of a voice input. The voice input determining unit 361 terminates the reception of a voice input when the face or the mouth of the user is no longer detected from an image obtained from the camera 330. The voice input determining unit 361 begins to receive a voice input when a voice input reception beginning input is received through an input unit (not illustrated), and terminates the reception of the voice input when a voice input reception terminating input is received. In certain embodiments, when the user pauses more than a predetermined period of time in the process of receiving a voice input, it is determined that inputting voice is terminated.

In certain embodiments, the voice recognition unit 362 converts voice signals that are sequentially generated from user voice inputs, into text information. The voice recognition unit 362 converts the generated voice signals into text blocks based on a streaming scheme. The operations of the voice recognition unit 362 are substantially identical to the operations of the voice recognition module 210, which has been described with reference to FIG. 2. The controller 360 transmits a voice signal or a converted text block to the server 106 based on a streaming scheme.

In certain embodiments, when the electronic device 100 receives an intermediate response or a final response from the responding module 250, the response output mode determining unit 363 determines an output mode that is appropriate for the present situation of the user in order to execute and output a response. For example, when noise that has a higher level than a predetermined level is received through the MIC, the response output mode determining unit 363 outputs a response execution result as video data through the display unit 350. Also, when it is determined, through the GPS 340, that the user moves faster than a predetermined speed, a response execution result is outputted as audio data through the SPK.

In certain embodiments, the response output controller 364 executes and outputs an intermediate response and a final response, which is received from the responding module 250. For example, when the intermediate response is at least one piece of application information associated with an estimated user's intention, the at least one piece of application information is provided through the display unit 350 (such as an icon). When a corrected intermediate response is received from the responding module 250 and related application information is more specified, the response output controller 340 provides the specified application information through the display unit 350 as an icon. When the final response is information associated with the execution of a function of a predetermined application, the response output controller 364 provides a result of the execution of the function of the corresponding application through at least one of the display unit 350 and the SPK. When the corrected final response is received from the server 106, the response output controller 364 outputs the result of the execution of the corrected final response. The response output controller 364 provides the result of the execution of a function of a new application, or provides a result obtained by re-executing, based on the corrected final response, the function of the application that has been executed based on the final response.

An electronic device, according to certain embodiments of the present disclosure, includes a display, a voice receiving device, a communication module, a memory and a processor. The memory stores instructions to enable the electronic device to perform receiving a sequence of speech elements through the voice receiving device, displaying first information that is based on at least a part of a first speech element out of the speech elements on the display, and displaying second information which is different than the first information on the display. The second information is based on at least a part of a second speech element that is received later than the first speech element among the speech elements.

According to various embodiments, when operations are executed, the memory further stores instructions to enable the electronic device to perform transmitting the first speech element to the outside of the electronic device through the communication module and receiving the first information from the outside of the electronic device through the communication module.

According to various embodiments of the present disclosure, when operations are executed, the memory further stores instructions to enable the electronic device to perform transmitting the second speech element to the outside of the electronic device through the communication module, after transmitting the first speech element to the outside of the electronic device through the communication module, and receiving the second information from the outside of the electronic device through the communication module, after receiving the first information from the outside of the electronic device through the communication module.

According to various embodiments of the present disclosure, the sequence of the speech elements includes at least a part of at least one sentence.

According to various embodiments of the present disclosure, the first speech element includes a phrase including one or more words, and does not form a complete sentence.

According to various embodiments of the present disclosure, the second speech element is a phrase including one or more words, and does not form a complete sentence, and forms at least a part of a single sentence together with the first speech element.

According to various embodiments of the present disclosure, the first information includes information that is generated, retrieved, and/or recommended based on the first speech element, and the second information includes information that is generated, retrieved, and/or recommended based on at least a part of a combination of the first information and a second speech element.

According to various embodiments of the present disclosure, the first information includes a map, and the second information includes position information on the map.

According to various embodiments of the present disclosure, when operations are executed, the memory further stores instructions to enable the electronic device to perform generating, retrieving, or recommending the first information by processing the first speech element, and generating, retrieving, or recommending the second information by processing the second speech element.

Figure 4:
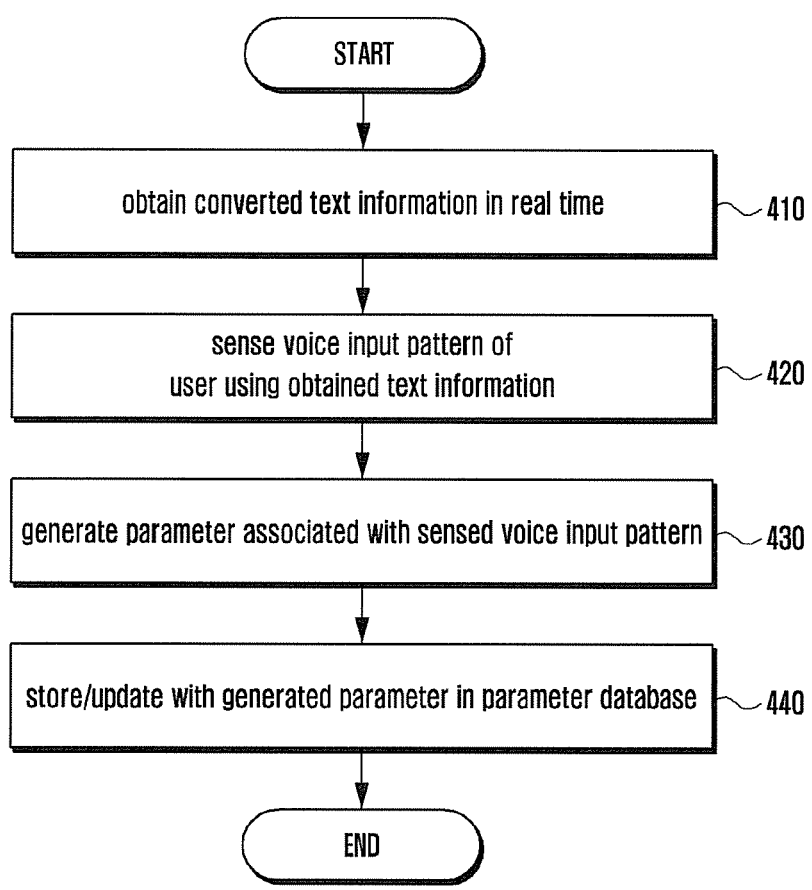
FIG. 4 is a flowchart illustrating an example method for a pattern sensing module to sense and process a pattern of user voice inputs according to this disclosure.

FIG. 4 is a flowchart illustrating an example method for the pattern sensing module 220 to sense and process a voice input pattern of a user according to this disclosure. The pattern sensing module 220 obtains text information that is converted from a user's voice input in operation 410. For example, the text information is obtained from the electronic device 100 or the voice recognition module 210. The pattern sensing module 220 senses a voice input pattern of the user using the obtained text information in operation 420, and generates a parameter associated with the sensed voice input pattern in operation 430. As described above, the parameter includes, for example, a pattern of a voice inputting speed, a pattern of frequently used words or a sentence, a pattern of the usage of a pause during speaking, or the like. The pattern sensing module 220 stores a generated parameter in the parameter database 230 in operation 440. When a parameter stored in advance exists, the parameter is updated with a new generated parameter.

Figure 5:
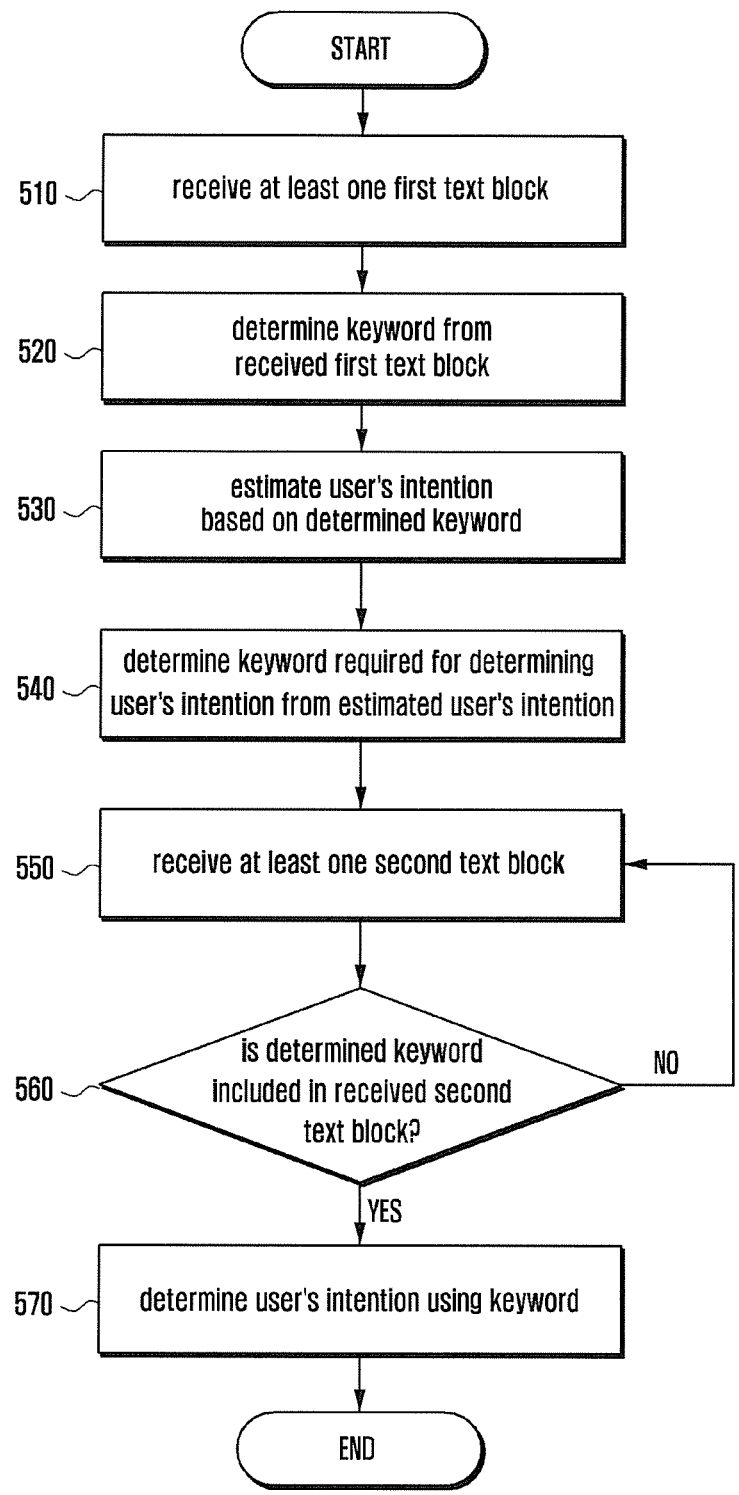
FIG. 5 is a flowchart illustrating an example method for a natural language processing module to execute natural language processing according to this disclosure.
Figure 6:
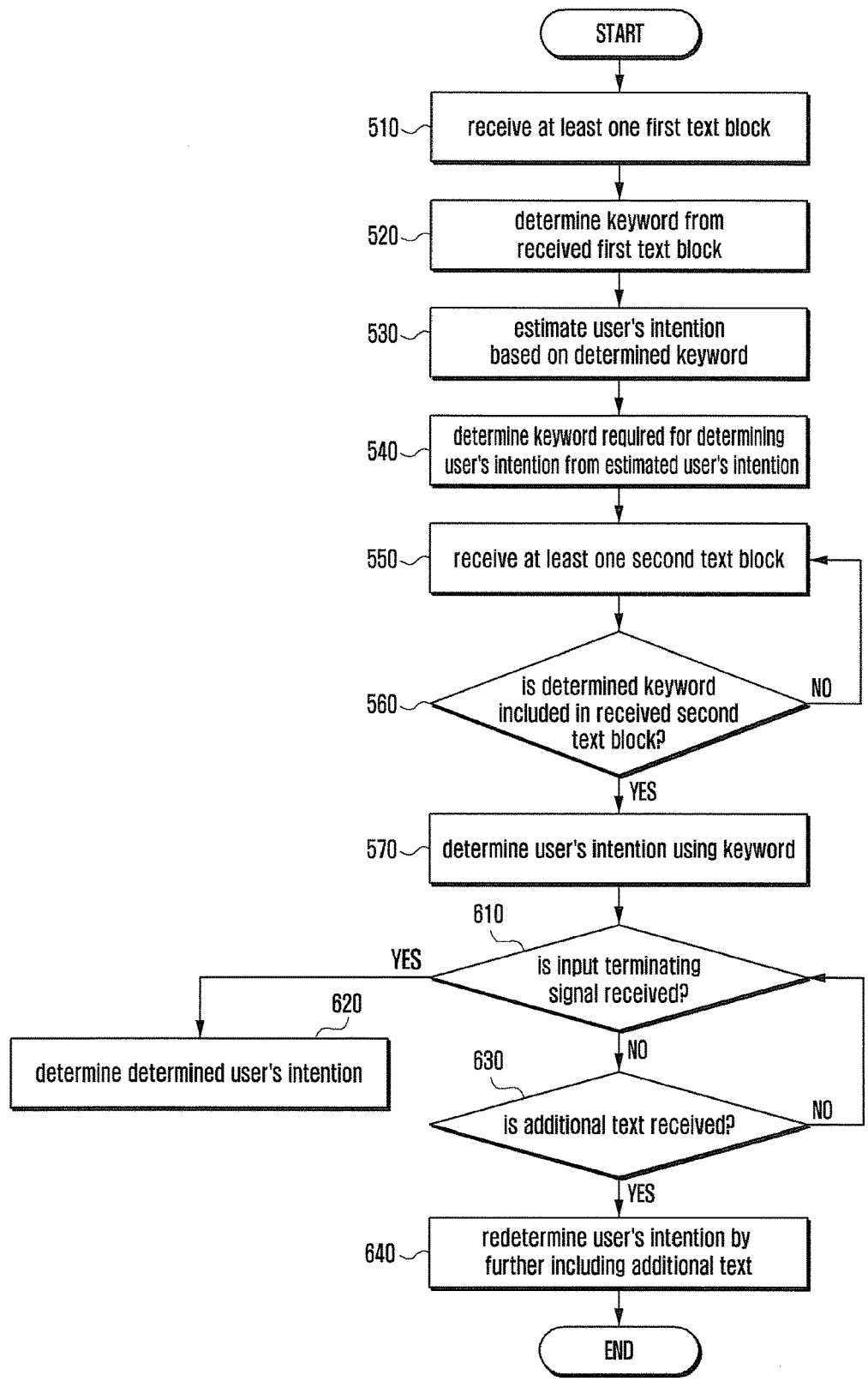
FIG. 6 is a flowchart illustrating an example method for a natural language processing module to execute natural language processing according to this disclosure.

FIGS. 5 and 6 are flowcharts illustrating an example method for the natural language processing module 240 to execute natural language processing according to this disclosure. According to an embodiment of the present disclosure, the natural language processing module 240 sequentially receives text blocks that are recognized and transferred from the electronic device 100 or the voice recognition module 210. The natural language processing module 240 executes natural language processing with respect to text in the sequentially received text blocks. The natural language processing that completes context, using the text in at least one text block, is executed based on the scheme as shown below.

Referring to FIGS. 5 and 6, the natural language processing module 240 receives at least one first text block in operation 510, and determines at least one keyword from the at least one first text block in operation 520. The natural language processing module 240 estimates the user's intention using a determined keyword in operation 530. For example, the natural language processing module 240 estimates, as the user's intention, at least one of searching for information using the determined keyword, executing a predetermined application program such as directions, editing data, and changing configurations. A mapping relationship between a keyword and the user's intention is set and stored in advance, and the natural language processing module 240 estimates the user's intention from the determined keyword based on the stored mapping relationship. The natural language processing module 240 takes into consideration text included in the received at least one first text blocks in order to estimate the user's intention. As another example, when a sentence corresponding to a user input is a relatively simple sentence, the natural language processing module 240 determines the user's intention based on a keyword included in the first text block.

In certain embodiments, the natural language processing module 240 determines a keyword required for determining the user's intention, based on the estimated user's intention, in operation 540. For example, the natural language processing module 240 stores a plurality of keywords, and predicts a range of keywords including at least one keyword required for determining the user's intention from among the stored keywords, based on the estimated user's intention. For example, when the estimated user's intention is "providing directions information," the natural language processing module 240 predicts a "place name" as a range of keywords. When the estimated user' intention is "inputting schedules," the natural language processing module 240 predicts "date and time" as a range of keywords.

In certain embodiments, the natural language processing module 240 sequentially receives at least one second text block, after the first text block, in operation 550. In operation 560, it is determined whether the determined keyword is included in the at least one second text block. For example, the natural language processing module 240 determines whether a keyword that corresponds to the predicted range of keywords is included in the successively received second text blocks.

When the keyword is not included in the received second text block, the method returns again to operation 550, and continuously receives second text blocks until the keyword is determined. When text blocks are continuously received without pause, even after the keyword is determined from the second text block, it is determined that the received text blocks form a sentence together. Additionally, the received text blocks include additional information associated with the keyword. Conversely, when a pause of a predetermined period of time (for example, at least a second) occurs, it is determined that a sentence is completed. For example, when it is determined whether a sentence is completed or a pause is provided, based on a pause between text blocks, the pattern sensing module 220 of FIG. 2 makes a decision based on a parameter stored in the parameter database 230, and inform the natural language processing module 240 of the result of the decision.

In certain embodiments, in operation 570, when a keyword is determined from the received second text block, the natural language processing module 240 determines the user's intention using the determined keyword based on the estimated user's intention. The natural language processing module 240 may take into consideration text included in the received text blocks forming the corresponding sentence in order to determine the user's intention.

FIG. 6 is a flowchart illustrating an example method for a natural language processing module to execute natural language processing module 240 according to this disclosure.

The natural language processing module 240 continuously receives text blocks until, for example, a voice input reception terminating signal indicating that a sentence is completed is provided. The natural language processing module 240 determines the user's intention by putting together the text blocks received until a signal indicating the completion of a sentence is provided, irrespective of whether a pause occurs while the text blocks are received.

For example, after the user's intention is determined in operation 570, the natural language processing module 240 determines whether a signal indicating the completion of a sentence, that is, a signal indicating that inputting voice is terminated, is received, in operation 610. When the signal is received, the user's intention determined in operation 570 is determined to be the user's intention in operation 620.

Conversely, in certain embodiments, when the signal is not received, text blocks including additional text are continuously received in operation 630, irrespective of whether a pause of a predetermined period of time occurs.

In certain embodiments, the natural language processing module 240 determines that the sentence is formed of the text blocks that are received until the signal indicating the completion of the sentence is input. An additionally received text block includes additional information associated with a determined keyword. The natural language processing module 240 re-determine the user's intention by adding the additional text to the determined user's intention in operation 640.

Figure 7:
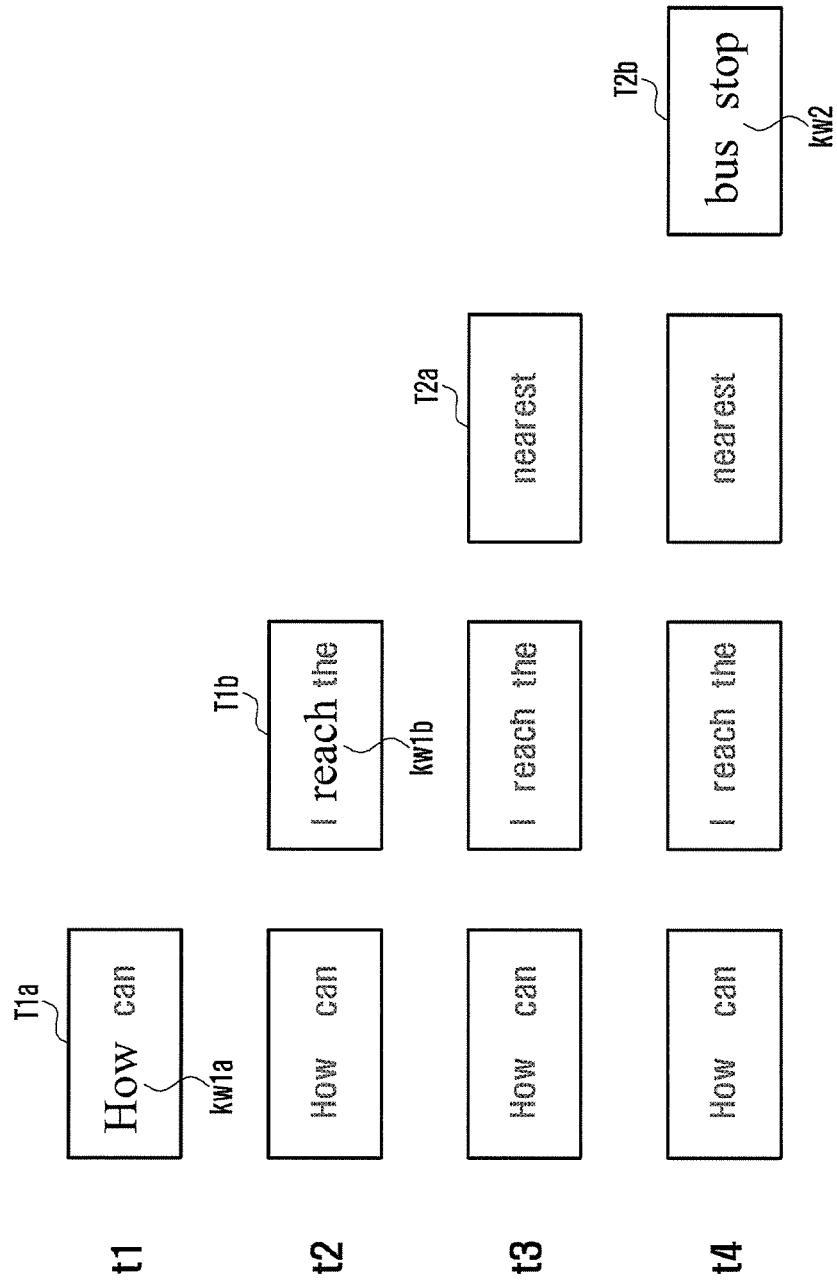
FIG. 7 illustrates an example configuration of a natural language processing executed by a natural language processing module according to this disclosure.
Figure 8:
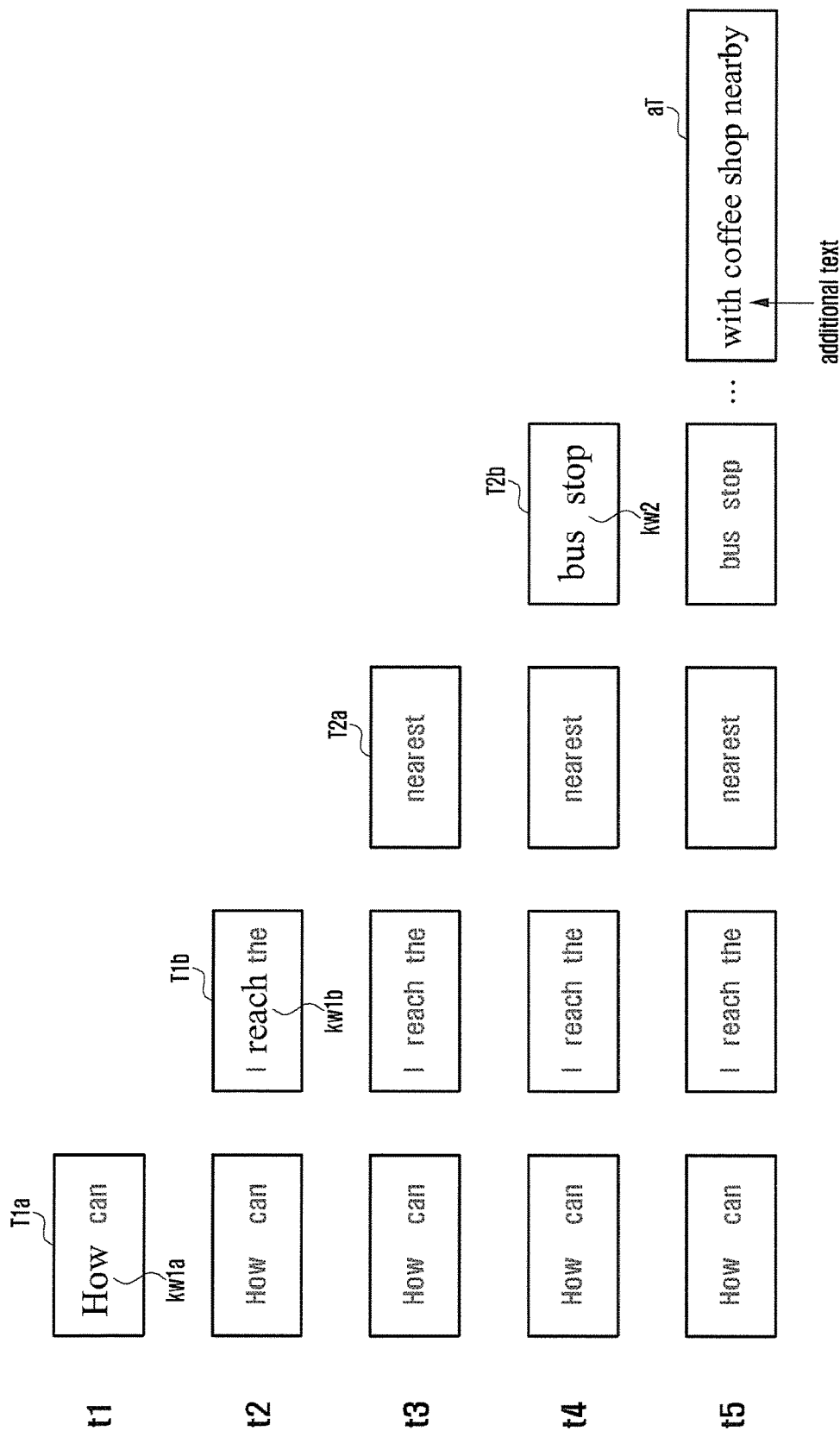
FIG. 8 illustrates another example configuration of a natural language processing executed by a natural language processing module according to this disclosure.

FIGS. 7 and 8 illustrates example configurations of natural language processing module 240 executed by a natural language processing according module according to this disclosure.

Referring to FIGS. 7 and 8, at t1, the natural language processing module 240 receives a first text block (T1a) including the text "How can." The natural language processing module 240 determines the words "How" and "can" so as to recognize the meaning, and determines that a type of an input sentence is associated with a question based on the keyword "How." The natural language processing module 240 transmit the result of the determination as an "estimated user's intention" to the responding module 250.

In certain embodiments, at t2, the natural language processing module 240 receives a first text block (T1b) subsequently including text "I reach the." The natural language processing module 240 determines the words "I", "reach", and "the" so as to recognize the meaning, and determines that a subject of the input sentence is associated with directions based on the keyword "reach." The natural language processing module 240 transmits a result of the determination as an "estimated user's intention" to the responding module 250. According to an embodiment of the present disclosure, the natural language processing module 240 determines that destination information (such as place information) is additionally needed to determine the estimated user's intention, and thus, determines whether a keyword including the destination information (such as, place information) is included in a text block to be received.

In certain embodiments, at t3, the natural language processing module 240 receives a second text block (T2a) including the text "nearest." The natural language processing module 240 determines the word "nearest" and recognizes the meaning, and determines whether the word corresponds to "place information." However, the word includes only additional information but does not include place information and thus, the natural language processing module 240 continuously receive a second text block.

In certain embodiments, at t4, the natural language processing module 240 receives a second text block (T2b) including text "bus stop." The natural language processing module 240 determines the words "bus" and "stop," and may recognize the meaning of a "bus stop." The natural language processing module 240 determines that "bus stop" is a second keyword (kw2) including the place information, and determines the user's intention by generally taking into consideration the second keyword (kw2) and the text included in the received text blocks. Therefore, the natural language processing module 240 determines that the user's intention of the corresponding sentence is "directions to the nearest bus stop." The natural language processing module 240 transmits the "determined user's intention" to the responding module 250.

The natural language processing module 240 determines the text blocks that are continuously received without a pause that exceeds a predetermined period of time, as a single sentence (such as a sentence to be processed), and determines the user's intention thereof. When a pause that exceeds the predetermined period of time occurs, it is determined that the sentence is completed, and thus, the user's intention is determined based on the text blocks received until now. For example, when it is determined whether a sentence is completed or a pause is provided, based on a pause between text blocks, the pattern sensing module 220 makes a decision based on a parameter stored in the parameter database 230, and inform the natural language processing module 240 of a result of the decision.

In a real situation, a user hesitates in speaking while providing a voice input or desire to add, to a corresponding sentence, additional information coming up later. Therefore, when a signal indicating that inputting voice is terminated, that is, a signal indicating that a sentence is completed, is received from, for example, the electronic device 100, the natural language processing module 240, according to an embodiment of the present disclosure, determines that the sentence is completed and determine the user's intention of the corresponding sentence.

FIG. 8 illustrates another example configuration of a natural language processing executed by a natural language processing module 240 according to this disclosure.

In certain embodiments, when a voice input terminating signal is not received, the natural language processing module 240 processes additional text as content that is added to a previous sentence even though the natural language processing module 240 receives the additional text "with coffee shop nearby" at t5 after a predetermined period of time. For example, the additional text includes limitations to the keyword "bus stop" (kw2).

In certain embodiments, the natural language processing module 240 re-determines the user's intention by additionally taking into consideration the additional text when a voice input terminating signal is received. In the present embodiment, the user's intention is re-determined to be "directions to the nearest bus stop with a coffee shop nearby." The natural language processing module 240 transmits the re-determined user's intention to the responding module 250.

Figure 9:
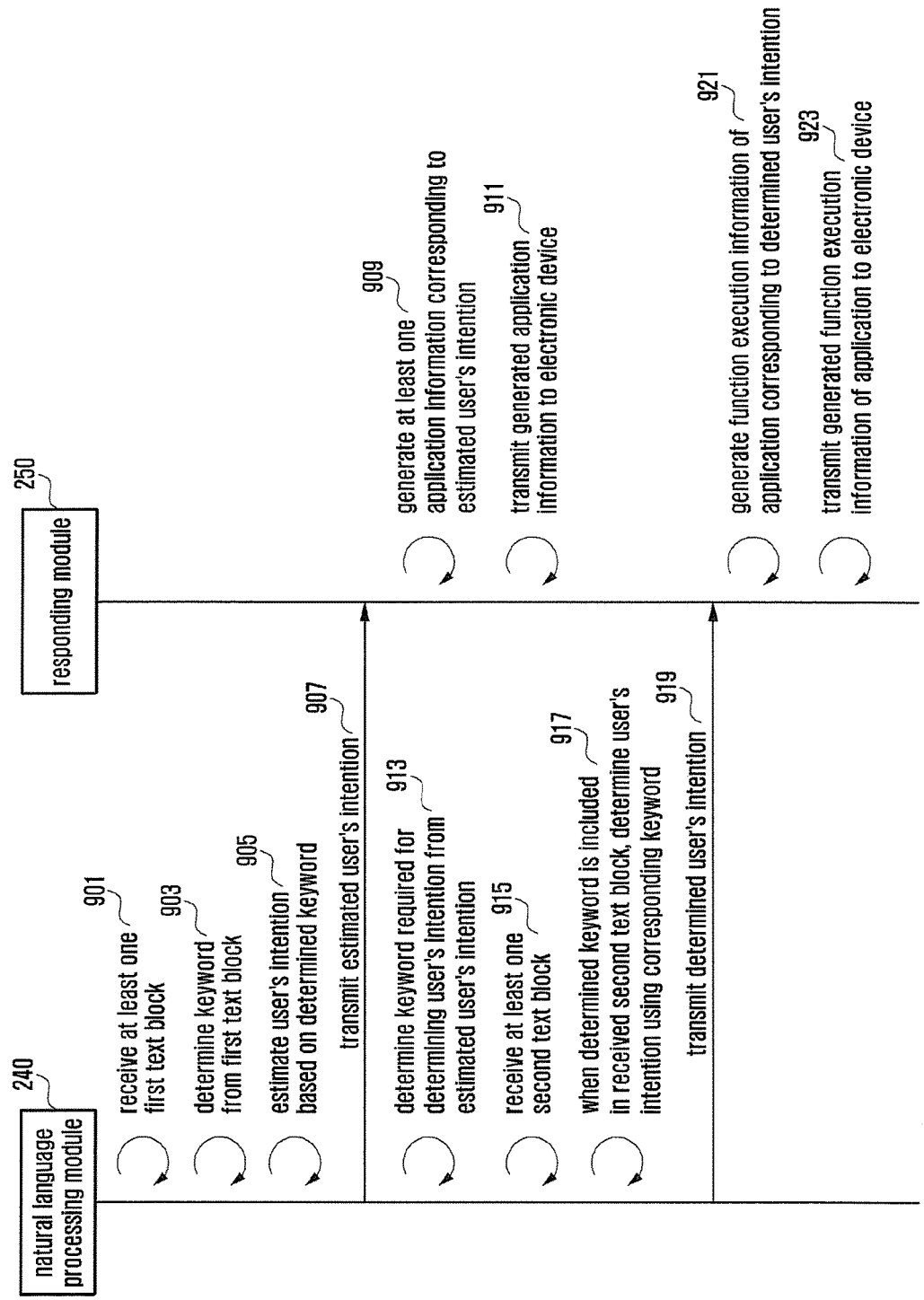
FIG. 9 is a flowchart illustrating an example method of performing a spoken interaction according to this disclosure.

FIG. 9 is a flowchart illustrating an example method of performing a spoken interaction between the natural language processing module 240 and the responding module 250 among the elements of the spoken interaction system 200 according to this disclosure.

In certain embodiments, the natural language processing module 240 receives at least one first text block from the electronic device 100 or the voice recognition module 210 based on a streaming scheme in operation 901, and determines a keyword from the received first text block in operation 903. The natural language processing module 240 estimates the user's intention based on the determined keyword in operation 905, and transmits the estimated user's intention to the responding module 250 in operation 907.

In certain embodiments, the responding module 250 generates an intermediate response corresponding to the estimated user's intention received from the natural language processing module 240, in operation 909. For example, the responding module 250 generates at least one piece of application information associated with the estimated user's intention. The responding module 250 transmits the generated intermediate response, for example, at least one piece of application information, to the electronic device 100, in operation 911.

Although not illustrated, the natural language processing module 240 corrects the estimated user's intention based on a keyword included in continuously received first text blocks, and transmits the corrected estimated user's intention again to the responding module 250. The responding module 250 corrects the intermediate response based on the corrected estimated user's intention. For example, the responding module 250 specifies the application information associated with the estimated user's intention. The responding module 250 transmits the corrected intermediate response, for example, the specified application information, to the electronic device 100.

In certain embodiments, the natural language processing module 240 determines a keyword required for determining the user's intention, based on the estimated user's intention, in operation 913. The natural language processing module 240 receives at least one second text block from the electronic device 100 or the voice recognition module 210 in operation 915, and when the determined keyword is included in the received at least one second text block, the natural language processing module 240 determines the user's intention using the corresponding keyword in operation 917. The natural language processing module 240 determines the user's intention using the keyword included in the second text block, based on the previously estimated user's intention. The natural language processing module 240 transmits the determined user's intention to the responding module 250, in operation 919.

In certain embodiments, the responding module 250 generates a final response corresponding to the determine user's intention received from the natural language processing module 240, in operation 921. For example, the responding module 250 generates function execution information of a predetermined application associated with the determined user's intention. The responding module 250 transmits the generated final response, for example, function execution information of a predetermined application, to the electronic device 100, in operation 923.

FIGS. 10A to 10D illustrate example method of performing a spoken interaction of the electronic device 100 according to this disclosure.

Figure 10A:
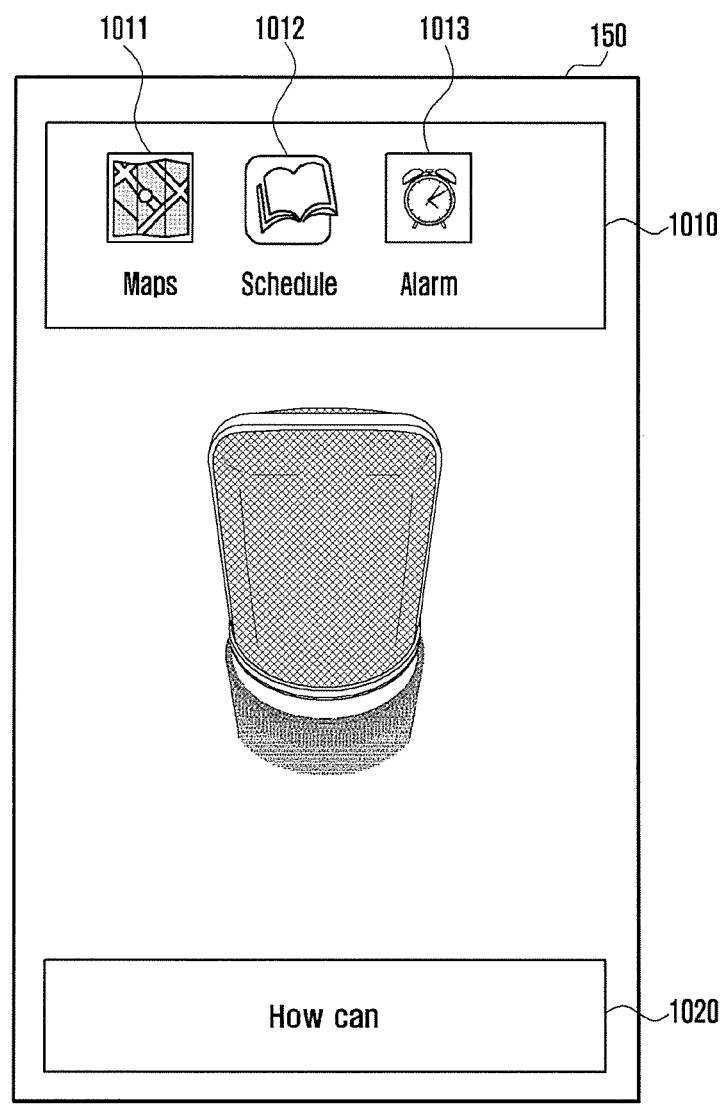
FIGS. 10A to 10D illustrate example methods of performing a spoken interaction according to this disclosure.

Referring to FIG. 10A, the electronic device 100 executes a spoken interaction function, and receives a voice input from a user. The electronic device 100 generates a voice signal based on a voice input provided from the user, and converts the generated voice signal into text information. For example, the electronic device 100 converts a voice signal into text information based on a block unit. The electronic device 100 outputs text including the words "How can" corresponding to the voice input provided from the user, to a predetermined area 1020 of the display 150. The electronic device 100 transmits, to the server 106, a voice signal or a text block including data "How can." The server 106 determines that a type of an input sentence is associated with a question based on the data "How can," and generates at least one piece of information based on a result of the determination and transmits the same to the electronic device 100. For example, the server 106 predicts the user's intention as search or setting, and transmits application information associated with search or setting to the electronic device 100. The electronic device 100 outputs the at least one piece of received application information, for example, map application information, schedule application information, and alarm application information, to a predetermined area 1010 of the display 150. The electronic device 100 displays icons 1011 to 1013, respectively corresponding to a map application, a schedule application, and an alarm application, in the predetermined area 1010.

Figure 10B:
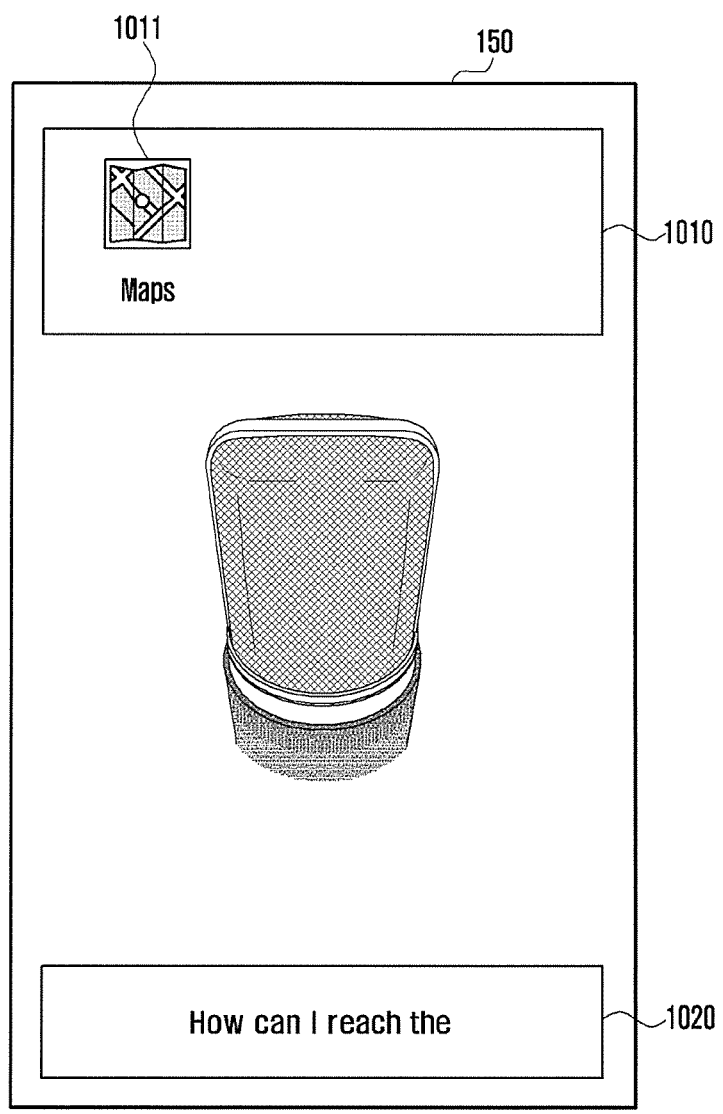

Referring to FIG. 10B, the electronic device 100 generates a voice signal based on a voice input provided from the user, and converts the generated voice signal into text information. The electronic device 100 outputs, to the pre-determined area 1020 of the display 150, text including the words "I reach the" corresponding to the voice input provided from the user. The electronic device 100 transmits, to the server 106, a voice signal or a text block including data "I reach the." The server 106 determines that a subject of an input sentence is associated with directions, based on the data "I reach the," and specifies related application information based on a result of the determination and transmits the same to the electronic device 100. For example, the server 106 re-estimates the user's intention to be a request for directions, and transmits application information associated with directions, for example, map application information, to the electronic device 100. The electronic device 100 continuously displays, through the display 150, only the icon 1011 corresponding to the received map application information, and deletes the remaining icons of unrelated applications which have been displayed.

Figure 10C:
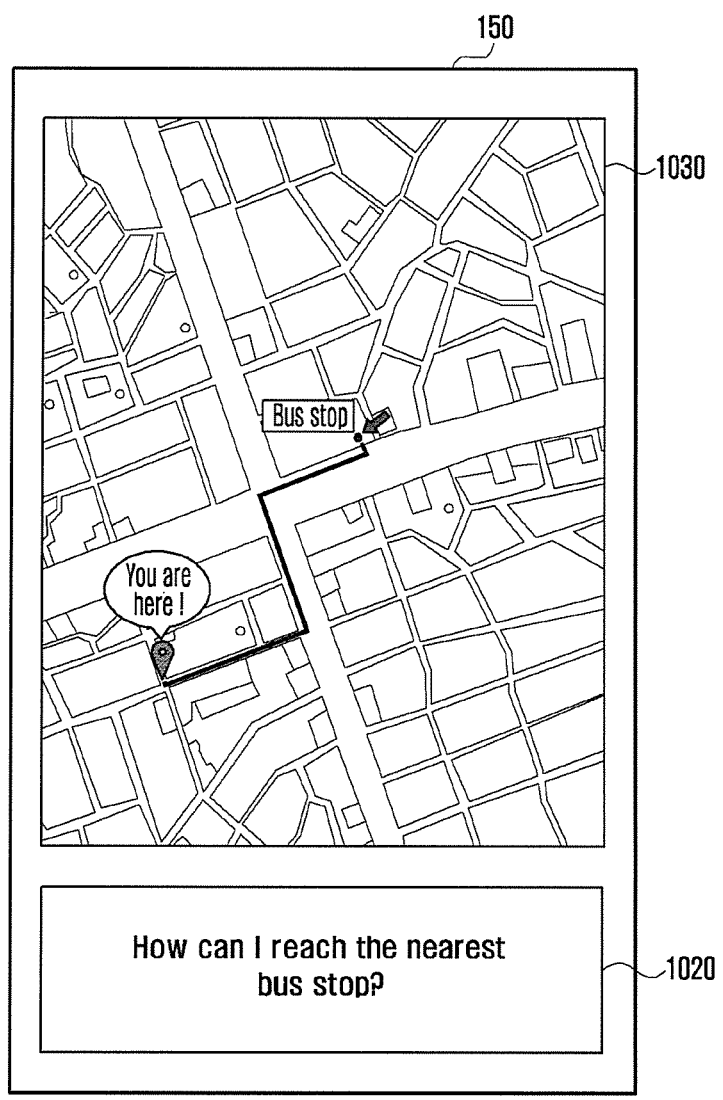

Referring to FIG. 10C, the electronic device 100 generates a voice signal based on voice inputs that are continuously provided from the user, and converts the generated voice signal into text information. The electronic device 100 outputs text that includes the words "nearest bus stop" corresponding to the voice inputs that are continuously provided from the user, to the predetermined area 1020 of the display 150. The electronic device 100 transmits, to the server 106, a voice signal or a text block including data "nearest bus stop." The server 106 determines the user's intention included in the input sentence, as a "request for directions to the nearest bus stop," based on the data "nearest bus stop." The server 106 generates a final response indicating "executing a map application to search for a route to the nearest bus stop," based on the determined user's intention, and transmits the generated final response to the electronic device 100. The electronic device 100 executes a map application and provides directions to the nearest bus stop in response to the received final response. For example, the electronic device 100 displays directions through an execution screen 1030 of the display 150, and outputs voice directions through a SPK.

Figure 10D:
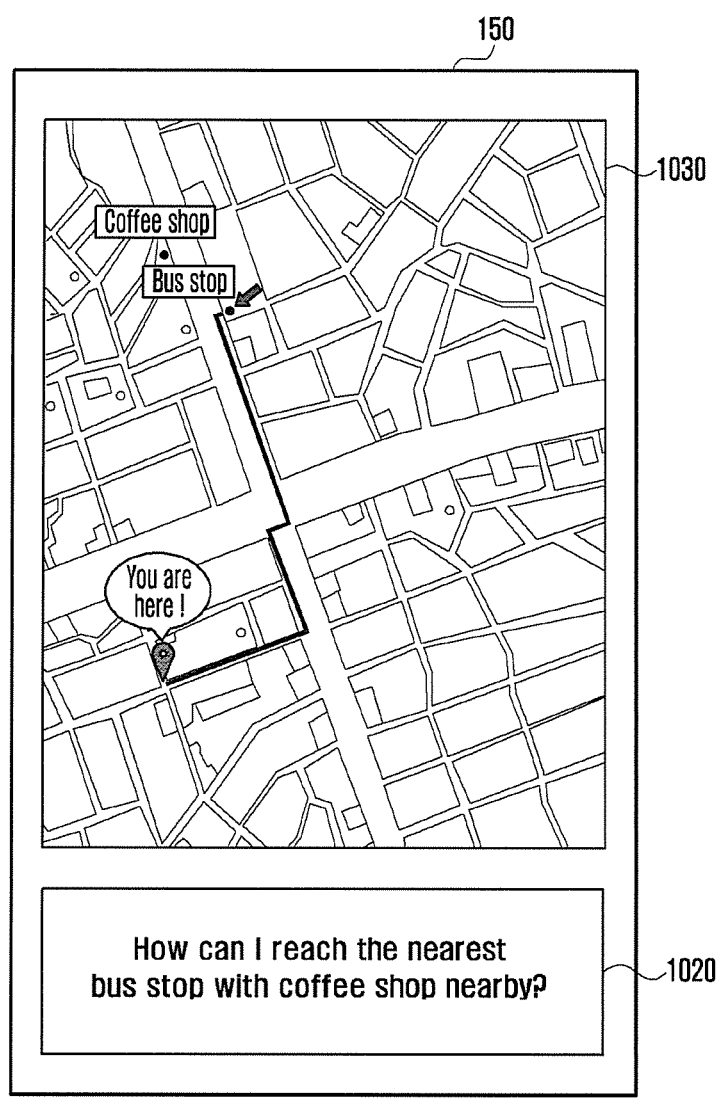

Referring to FIG. 10D, subsequently, the electronic device 100 receives user voice inputs. When voice inputs "with coffee shop nearby" are successfully received, the electronic device 100 generates a voice signal based on the voice inputs, and converts the generated voice signal into text information. The electronic device 100 outputs text including the words "with coffee shop nearby" to the predetermined area 1020 of the display 150. The electronic device 100 transmits, to the server 106, a voice signal or a text block including data "with coffee shop nearby." The server 106 re-determines the user's intention included in the entire input sentence as a "request for directions to the nearest bus stop with the coffee shop nearby," based on the data "with coffee shop nearby." The server 106 generates a corrected final response indicating "executing a map application to request directions to the nearest bus stop with a coffee shop nearby," based on the re-determined user's intention, and transmits the corrected final response to the electronic device 100. The electronic device 100 executes to provide the directions to the nearest bus stop with a coffee shop nearby, through the map application, in response to the corrected final response.

Figure 11A:
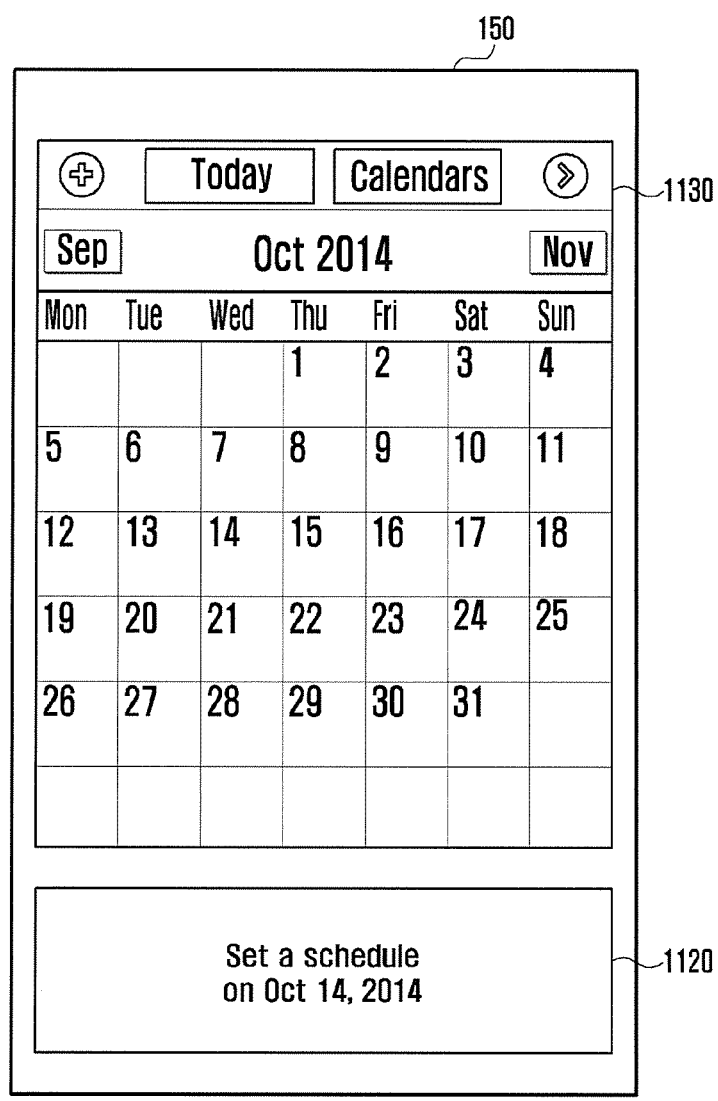
FIGS. 11A to 11B illustrate another example methods of performing a spoken interaction according to this disclosure.
Figure 11B:
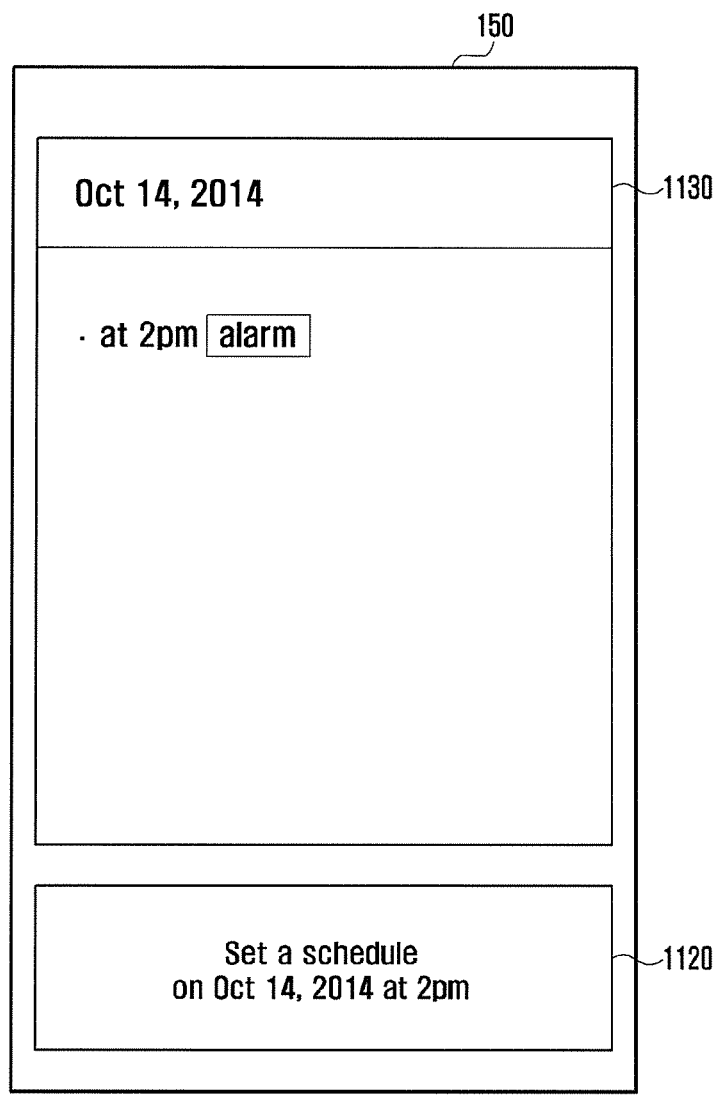

FIGS. 11A to 11B illustrate another example method of showing a spoken interaction of the electronic device 100 according to this.

Referring to FIG. 11A, the electronic device 100 receives a voice input "Set a schedule on Oct. 14, 2014" from a user while executing a spoken interaction function, and subsequently, a pause of a predetermined period of time occurs. The electronic device 100 generates a voice signal based on the received voice input, and converts the generated voice signal into text information. The electronic device 100 outputs text including the words "Set a schedule on Oct. 14, 2014" corresponding to the voice input, to a predetermined area 1120 of the display 150. The electronic device 100 transmits, to the server 106, a voice signal or a text block including data "Set a schedule on Oct. 14, 2014, based on a streaming scheme." The server 106 determines the user's intention included in an input sentence to be "setting a schedule on Oct. 14, 2014," based on data "Set a schedule on Oct. 14, 2014," and determines that time information is additionally required to set a schedule. The server 106 transmits, to the electronic device 100, an intermediate response indicating "setting a schedule on Oct. 14, 2014". The electronic device 100 executes a schedule application in an execution screen 1130, in response to the received intermediate response.

Referring to FIG. 11B, the electronic device 100 receives voice inputs "2 pm" including time information. The electronic device 100 generates a voice signal based on the received voice input, and converts the generated voice signal into text information. The electronic device 100 outputs text including the word "2 pm" corresponding to the voice input, to the predetermined area 1120 of the display 150. The electronic device 100 transmits, to the server 106, a voice signal or a text block including data "2 pm." The server 106 determines the user's intention included in the input sentence to be "setting a schedule at 2 pm on Oct. 14, 2014," based on data "2 pm." The server 106 transmits the final response indicating "setting a schedule at 2 pm on Oct. 14, 2014" to the electronic device 100. The electronic device 100 displays the content of the set schedule in the execution screen 1130, in response to the received final response. Alternatively, the content of the set schedule is outputted through a SPK.

Figure 12A:
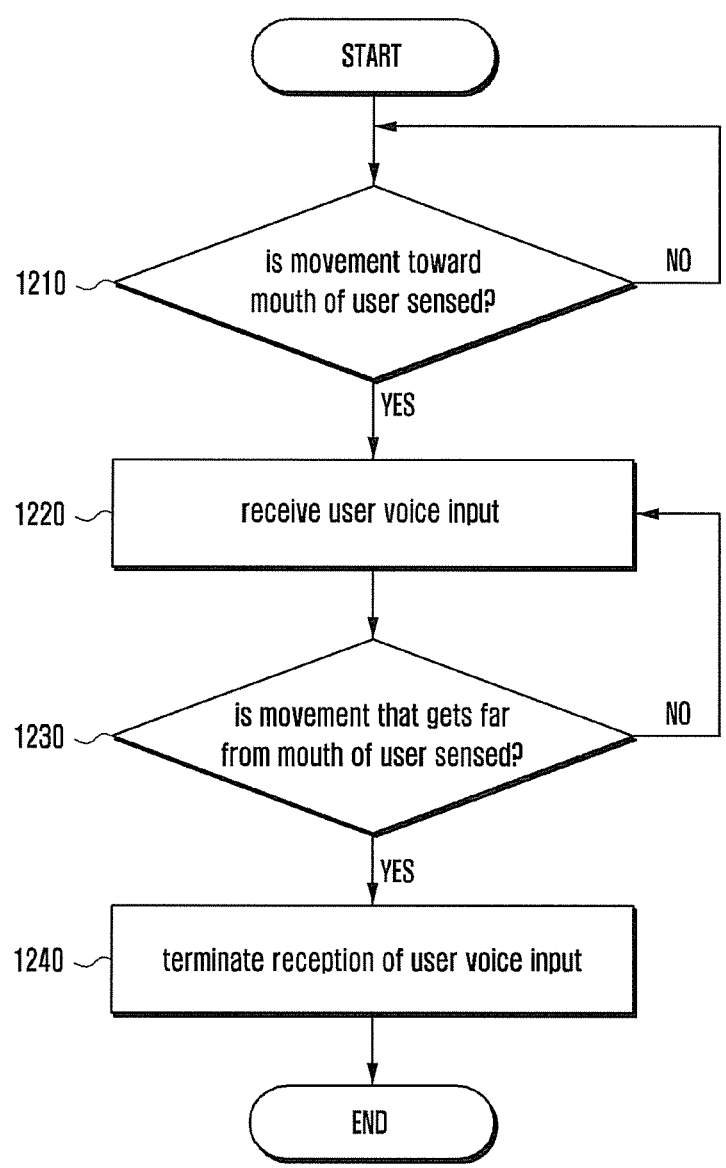
FIGS. 12A to 12B are flowchart illustrating an example method of beginning or terminating e the reception of a voice input according to this disclosure.
Figure 12B:
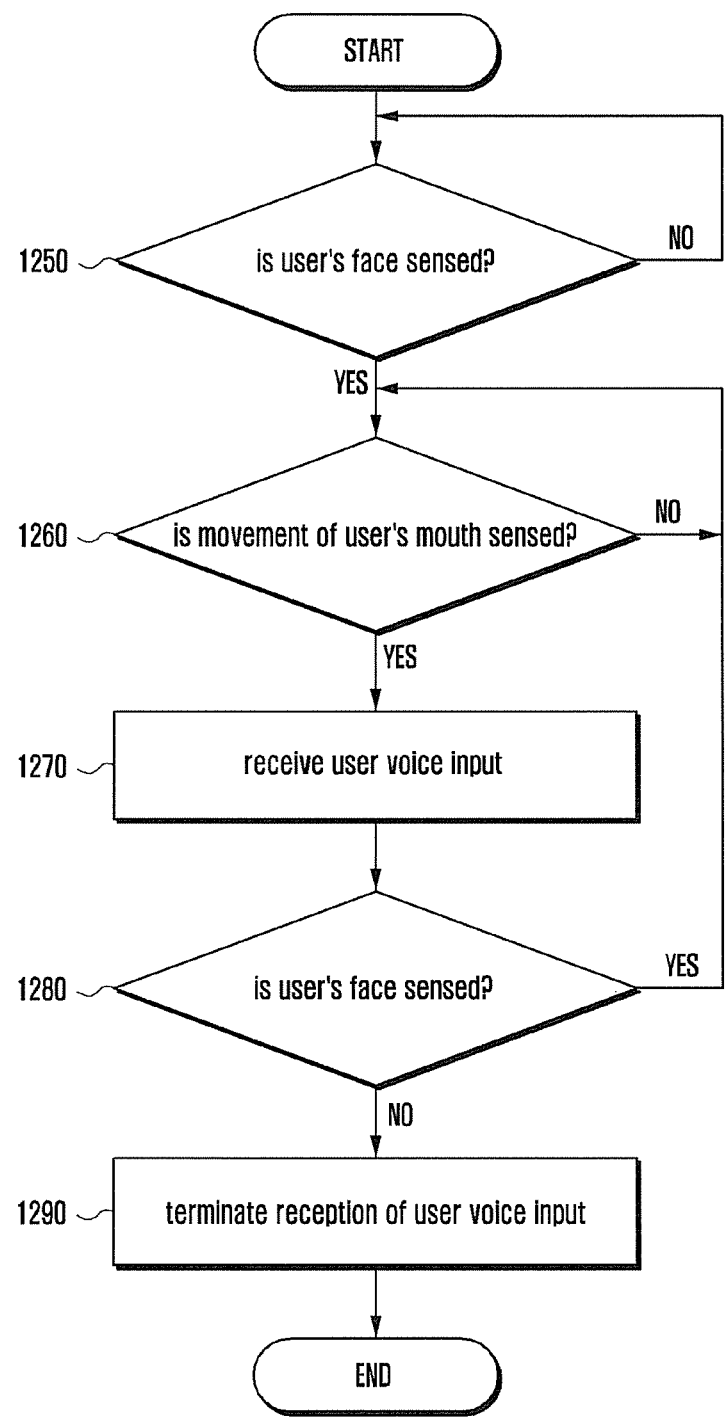

FIGS. 12A and 12B are flowcharts illustrating operations in which the electronic device 100 begins and terminates reception of a voice input according to this disclosure.

FIG. 12A illustrates determining whether to begin or terminate reception of a user voice input using movement information or the like of the electronic device 100 that the sensor unit 320 obtains, according to this disclosure.

In certain embodiments, it is determined whether the movement of the electronic device 100 toward the face or the mouth of the user is sensed, in operation 1210, and when it is determined that the electronic device 100 moves to the face or the mouth, a user voice input is received in operation 1220. The electronic device 100 executes a spoken interaction function together with receiving a user voice input.

In certain embodiments, in operation 1230, a motion of removing the electronic device 100 from the face or the mouth of the user is sensed. Until the movement is sensed, the electronic device 100 continuously receives a user voice input. When the movement is sensed, the electronic device 100 terminates the reception of a user voice input in operation 1240. In this instance, a voice input terminating signal indicating that a sentence is completed is generated, and the generated voice input terminating signal is transmitted to the voice recognition module 210 or the natural language processing module 240.

FIG. 12B illustrates determining whether to begin or terminate reception of a user voice input using image information that the camera 330 obtains according to this disclosure.

In certain embodiments, it is determined in operation 1250 whether the face or the mouth of the user is sensed from image information that the camera 330 obtains, and when the face or the mouth of the user is sensed, whether the mouth of the user moves is sensed in operation 1260. When the movement of the mouth of the user is sensed, the electronic device 100 receives a user voice input in operation 1270. The electronic device 100 executes a spoken interaction function together with receiving a user voice input.

In certain embodiments, it is determined in operation 1280 whether the face or the mouth of the user is continuously sensed from the image information that the camera 330 obtains. When the face or the mouth of the user is sensed, a voice input is continuously received until the face or the mouth of the user is not sensed, irrespective of whether the mouth moves. When the movement of the face or the mouth of the user is not sensed any longer, the electronic device 100 terminates reception of a user voice input in operation 1290. In this instance, a voice input terminating signal indicating that a sentence is completed is generated, and the generated voice input terminating signal is transmitted to the voice recognition module 210 or the natural language processing module 240.

Figure 13:
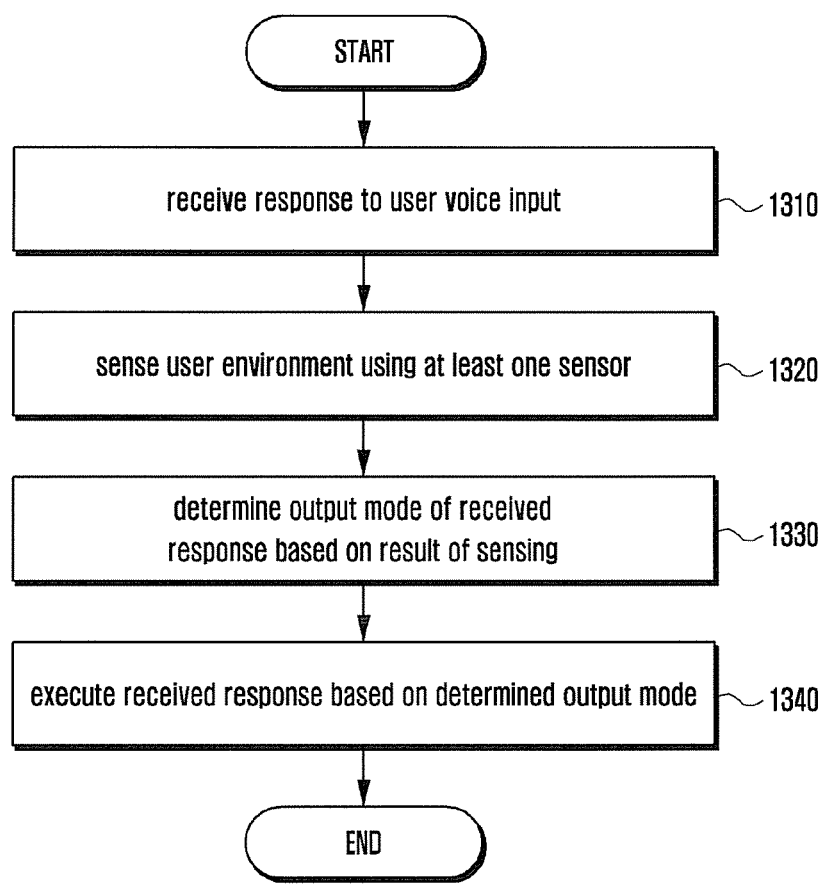
FIG. 13 is a flowchart illustrating an example method of responding output mode to determine operation of an electronic device according to this disclosure.

FIG. 13 is a block diagram illustrating an example method of responding output mode to determine operation of an electronic device 100 according to this disclosure.

In certain embodiments, the electronic device 100 receives a response to a user voice input, from the responding module 250, in operation 1310. The electronic device senses a user environment through at least one sensor in operation 1320, and determines an output mode of the received response, based on the result of sensing, in operation 1330. Subsequently, the received response is executed based on the determined output mode and is outputted in operation 1340. The sensor includes at least one of a GPS, a microphone, a gyro sensor, and a proximity sensor. The output mode is, for example, a video data output mode or an audio data output mode. Alternatively, the output mode is an output mode that outputs video data and audio data together.

For example, the electronic device 100 prefers a video data output mode when a noise level is greater than or equal to a predetermined value, and prefers an audio data output mode when a movement speed is greater than or equal to a predetermined value.

In certain embodiments, for example, when a noise value of an abnormal level is detected and it is sensed that the device moves in a speed of walking, it is determined that the user walks through a busy place. In this instance, it is easy for the user to determine a response execution result through a screen and thus, the electronic device 100 outputs the response execution result as at least video data. According to an embodiment of the present disclosure, noise from the external environment of the user is difficult to be accurately measured when a user voice input is received and thus, the noise is measured when a user voice input is not received. Whether a received user voice input is determined by detecting a movement of the mouth of the user included in an image obtained through the camera 330, as described above.

In certain embodiments, when a normal level noise is detected and it is sensed that the device moves fast, it is determined that the user moves by riding on a car. In this instance, when the face or the mouth of the user is not detected, it is determined that the user drives the car. In this instance, it is easy for the user to determine a response execution result through sound and thus, the electronic device 100 outputs the response execution result as at least audio data. According to an embodiment of the present disclosure, when the face or the mouth of the user is sensed, it is determine that the situation allows the user to check out the screen, and thus, provides a response execution result as video data.

A method of operating an electronic device includes receiving, by the electronic device including a display and a voice receiving device, a sequence of speech elements through the voice receiving device, displaying, on the display by the electronic device, first information that is based on at least a part of a first speech element out of the speech elements, and displaying, on the display by the electronic device, second information, which is different from the first information and is based on at least a part of a second speech element that is received later than the first speech element among the speech elements.

According to various embodiments of the present disclosure, the method further includes transmitting, by the electronic device, the first speech element to the outside of the electronic device through a communication module, and receiving, by the electronic device, the first information from the outside of the electronic device through the communication module.

According to various embodiments of the present disclosure, the method further includes transmitting, by the electronic device, the second speech element to the outside of the electronic device through the communication module, after transmitting the first speech element to the outside of the electronic device through the communication module, and receiving, by the electronic device, the second information from the outside of the electronic device through the communication module, after receiving the first information from the outside of the electronic device through the communication module.

According to various embodiments of the present disclosure, the sequence of the speech elements includes at least a part of at least one sentence.

According to various embodiments of the present disclosure, the first speech element is a phrase including one or more words, and does not form a complete sentence.

According to various embodiments of the present disclosure, the second speech element is a phrase including one or more words, and does not form a complete sentence, and forms at least a part of a sentence together with the first speech element.

According to various embodiments of the present disclosure, the first information includes information that is generated, retrieved, and/or recommended based on the first speech element, and the second information includes information that is generated, retrieved, and/or recommended based on at least a part of a combination of the first information and the second speech element.

According to various embodiments of the present disclosure, the first information includes a map, and the second information includes position information on the map.

According to various embodiments of the present disclosure, the method further includes generating, retrieving, or recommending, by the electronic device, the first information by processing the first speech element, and generating, retrieving, or recommending, by the electronic device, the second information by processing the second speech element.

Figure 14:
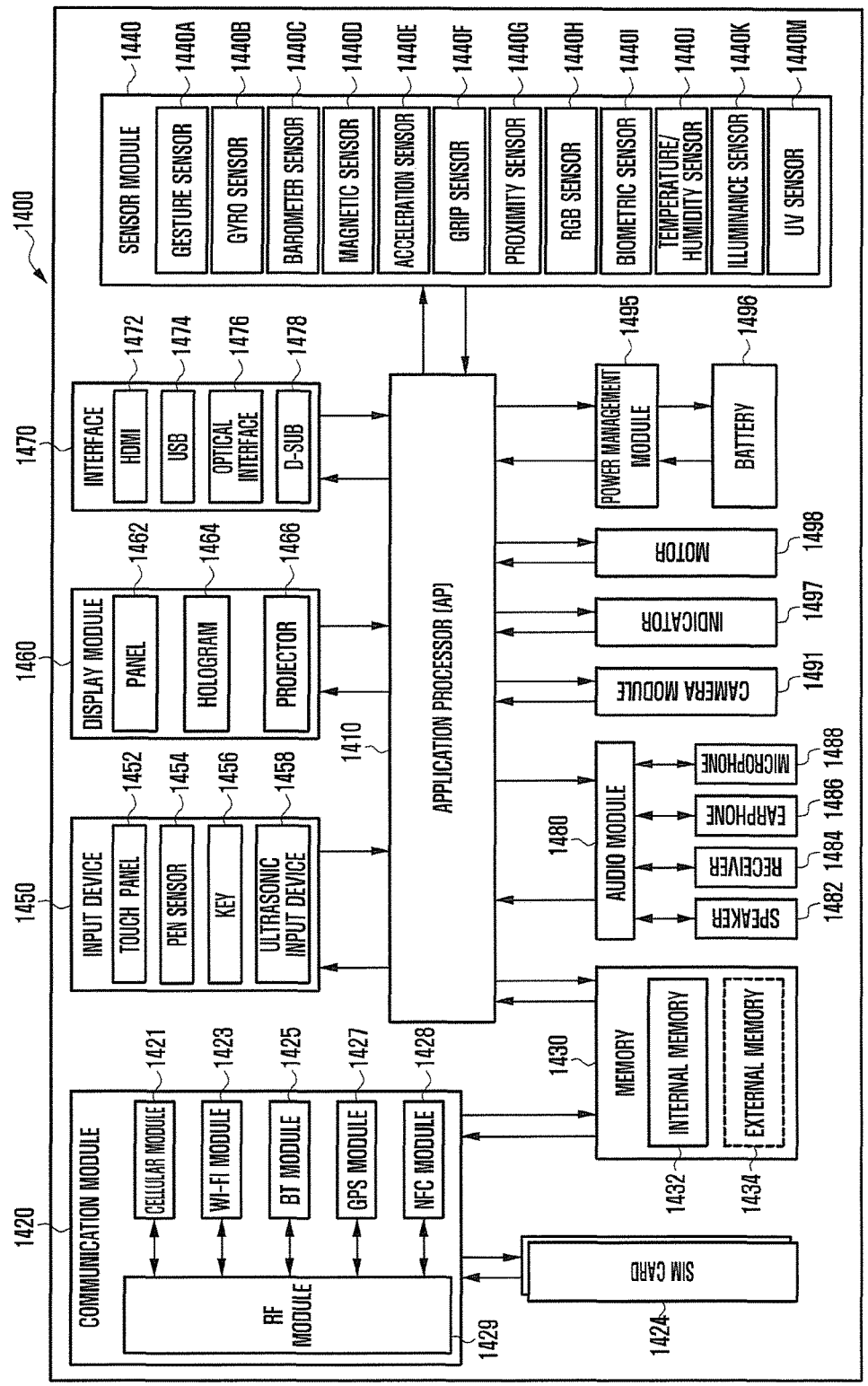
FIG. 14 is a diagram schematically illustrating an example configuration of an electronic device according to this disclosure.

FIG. 14 is a diagram schematically illustrating an example configuration of an electronic device according to this disclosure. The electronic device 1400, for example, constitutes all or a part of the electronic device 100 shown in FIG. 1.

Referring to FIG. 14, the electronic device 1400 includes at least one application processor (AP) 1410, a communication module 1420, at least one subscriber identity module (SIM) card 1424, a memory 1430, a sensor module 1440, an input module 1450, a display 1460, an interface 1470, an audio module 1480, a camera module 1491, a power management module 1495, a battery 1496, an indicator 1497, and a motor 1498.

The AP 1410 drives an operating system or an application program to control a plurality of hardware or software components connected to the AP 1410, and performs processing and operations of various data including multimedia data. The AP 1410, for example, is implemented as a system on chip (SoC). The AP 1410 further includes a graphic processing unit (GPU) (not shown).

The communication module 1420 (such as the communication interface 160) performs data transmission/reception in communication with other electronic devices (such as the electronic device 104 and the server 106) connected to the electronic device 1400 (such as the electronic device 101) through a network. The communication module 1420 includes a cellular module 1421, a WiFi module 1423, a BT module 1425, a GPS module 1427, an NFC module 1428, and a radio frequency (RF) module 1429.

The cellular module 1421 provides a voice call, a video call, an SMS service, an Internet service, and the like through a communication network (such as LTE, LTE-A, CDMA, WCDMA, UMTS, WiBro, or GSM). Also, the cellular module 1421 identifies and authenticates an electronic device in a communication network by using, for example, a subscriber identification module (such as the SIM card). The cellular module 1421 performs at least some of the functions that are provided by the AP 1410. For example, the cellular module 1421 performs at least a multimedia control function.

In certain embodiments, the cellular module 1421 includes a communication processor (CP). Furthermore, the cellular module 1421, for example, is implemented as a system on chip (SoC). Although the cellular module 1421 (such as a CP), the memory 1430, the power management module 1495, and the like are shown as separate elements from the AP 1410 in FIG. 14, the AP 1410 is implemented to include at least some (such as the cellular module 1421) of the aforementioned elements.

In certain embodiments, the AP 1410 or the cellular module 1421 (such as a CP) loads a command or data received from at least one of a non-volatile memory and other elements connected thereto into a volatile memory and process the loaded command or data. Furthermore, the AP 1410 or the cellular module 1421 store data received from or generated by at least one of other elements in a non-volatile memory.

Each of the WiFi module 1423, the BT module 1425, the GPS module 1427, and the NFC module 1428, for example, include a processor for processing data transmitted or received through the corresponding module. Although the cellular module 1421, the WiFi module 1423, the BT module 1425, the GPS module 1427, and the NFC module 1428 are shown as separate blocks in FIG. 14, at least some (such as two or more) of the cellular module 1421, the WiFi module 1423, the BT module 1425, the GPS module 1427, and the NFC module 1428 is included in one integrated chip (IC) or one IC package according to an embodiment. For example, at least some of processors corresponding to the cellular module 1421, the WiFi module 1423, the BT module 1425, the GPS module 1427, and the NFC module 1428, respectively (such as a CP corresponding to the cellular module 1421 and a WiFi processor corresponding to the WiFi module 1423) are implemented as one SoC.

The RF module 1429 performs data transmission/reception, for example, RF signal transmission/reception. Although not shown in the drawing, the RF module 1429, for example, includes a transceiver, a power amp module (PAM), a frequency filter, a low noise amplifier (LNA), and the like. Also, the RF module 1429 further includes a component for transmitting/receiving an electromagnetic wave over the air in wireless communication, such as a conductor or a conducting wire. Although FIG. 14 shows that the cellular module 1421, the WiFi module 1423, the BT module 1425, the GPS module 1427, and the NFC module 1428 share one RF module 1429, at least one of the cellular module 1421, the WiFi module 1423, the BT module 1425, the GPS module 1427, and the NFC module 1428 perform RF signal transmission/reception through a separate RF module according to this disclosure.

The at least one SIM card 1424 is a card including a subscriber identification module, and inserted into at least one slot formed in a certain position of the electronic device. The at least one SIM card 1424 includes unique identification information (such as integrated circuit card identifier (ICCID)) or subscriber information (such as international mobile subscriber identity (IMSI)).

The memory 1430 (such as the memory 130) includes an internal memory 1432 or an external memory 1434. The internal memory 1432, for example, includes at least one of a volatile memory (such as a dynamic RAM (DRAM), a static RAM (SRAM), or a synchronous dynamic RAM (SDRAM)) and a non-volatile memory (such as a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, or an NOR flash memory).

In certain embodiments, the internal memory 1432 is a solid state drive (SSD). The external memory 1434 further includes a flash drive, for example, a compact flash (CF), a secure digital (SD), a micro secure digital (Micro-SD), a mini secure digital (Mini-SD), an extreme digital (xD), or a memory stick. The external memory 1434 is functionally connected to the electronic device 1400 through various interfaces. The electronic device 1400 further includes a storage device (or storage medium) such as a hard drive.

The sensor module 1440 measures a physical quantity or detects an operation state of the electronic device 1400 and converts the measured or detected information into an electronic signal. The sensor module 1440, for example, includes at least one of a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (such as a red, green and blue (RGB) sensor), a biometric sensor 1440I, a temperature/humidity sensor 1440J, a light sensor 1440K, and a ultraviolet (UV) sensor 1440M. Additionally or alternatively, the sensor module 1440, for example, includes an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scanner (not shown), and/or a fingerprint sensor (not shown). The sensor module 1440 further includes a control circuit for controlling one or more sensors included therein.

The input module 1450 includes a touch panel 1452, a (digital) pen sensor 1454, a key 1456, or an ultrasonic input unit 1458. The touch panel 1452 that recognizes a touch input, for example, includes at least one of a capacitive touch panel, a resistive touch panel, an infrared touch panel, and an acoustic wave touch panel. Also, the touch panel 1452 further includes a control circuit. When the touch panel is a capacitive touch panel, it recognizes a physical contact or proximity. The touch panel 1452 also further includes a tactile layer. In this case, the touch panel 1452 provides a tactile response to a user.

The (digital) pen sensor 1454, for example, is implemented using a means identical or similar to a means for receiving a touch input from a user or using a separate recognition sheet. The key 1456, for example, includes a physical button, an optical key, or a keypad. The ultrasonic input unit 1458 is a unit that identifies data by generating an ultrasonic signal through an input tool and detecting a sonic wave through a microphone (such as the microphone 688) in the electronic device 600, and is capable of wireless recognition. The electronic device 1400 also receives a user input from an external device (such as computer or server) connected thereto by using the communication module 1420.

The display 1460 (such as the display 150) includes a panel 1462, a hologram unit 1464, or a projector 1466. The panel 1462, for example, is a liquid crystal display (LCD) or an active matrix-organic light emitting diode (AM-OLED). The panel 1462, for example, is to be flexible, transparent, or wearable. The panel 1462 is also incorporated into one module together with the touch panel 1452. The hologram unit 1464 shows a stereoscopic image in the air by using light interference. The projector 1466 displays an image by projecting light onto a screen. The screen, for example, is located inside or outside of the electronic device 1400. The display 1460 further includes a control circuit for controlling the panel 1462, the hologram unit 1464, or the projector 1466.

The interface 1470, for example, includes a high-definition multimedia interface (HDMI) 1472, a universal serial bus (USB) 1474, an optical interface 1476, or a D-subminiature (D-sub) 1478. The interface 1470, for example, is included in the communication interface 160 shown in FIG. 1. Additionally or alternatively, the interface 1490, for example, includes a mobile high-definition link (MHL) interface, a secure digital (SD) card/multimedia card (MMC) interface, or an infrared data association (IrDA) interface.

The audio module 1480 provides bidirectional conversion between a sound and an electronic signal. At least some elements of the audio module 1480, for example, is included in the input/output interface 140 shown in FIG. 1. The audio module 1480, for example, processes sound information input or output through a speaker 1482, a receiver 1484, earphones 1486, or the microphone 1488.

The camera module 1491 is a device that takes both still and moving images, and includes one or more image sensors (such as a front sensor or a rear sensor, not shown), a lens (not shown), an image signal processor (ISP) (not shown), or a flash (such as an LED or xenon lamp, not shown).

The power management module 1495 manages power of the electronic device 1400. Although not shown, the power management module 1495, for example, includes a power management integrated circuit (PMIC), a charger IC, or a battery or fuel gauge.

The PMIC, for example, is mounted in an IC or an SoC semiconductor. Charging methods is classified into wired charging and wireless charging. The charger IC charges a battery, and prevents an overvoltage or excess current from being induced or flowing from a charger. The charger IC includes a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier is added for the wireless charging.

The battery gauge, for example, measures the residual capacity, charge in voltage, current, or temperature of the battery 1496. The battery 1496 stores or generates electricity, and supplies power to the electronic device 1400 by using the stored or generated electricity. The battery 1496, for example, includes a rechargeable battery or a solar battery.

The indicator 1497 displays a specific status of the electronic device 1400 or a part thereof (e.g., the AP 1410), for example, a boot-up status, a message status, or a charging status. The motor 1498 converts an electrical signal into a mechanical vibration. Although not shown, the electronic device 1400 includes a processing unit (e.g., GPU) for supporting a mobile TV. The processing unit for supporting a mobile TV processes media data pursuant to a certain standard, for example, digital multimedia broadcasting (DMB), digital video broadcasting (DVB), or media flow.

Each of the above described elements of the electronic device is formed by one or more components, and the names of the corresponding elements vary according to the type of the electronic device. The electronic device according to this disclosure includes at least one of the above described elements, and excludes some of the elements or further includes other additional elements. Furthermore, some of the elements of the electronic device according to the present disclosure is coupled to form a single entity while performing the same functions as those of the corresponding elements before the coupling.

The term "module" as used in the present disclosure, for example, means a unit including one of hardware, software, and firmware or any combination of two or more of them. The "module", for example, is interchangeable with the term "unit", "logic", "logical block", "component", or "circuit". The "module" is the smallest unit of an integrated component or a part thereof. The "module" is the smallest unit that performs one or more functions or a part thereof. The "module" is mechanically or electronically implemented. For example, the "module" includes at least one of an application-specific integrated circuit (ASIC) chip, a field-programmable gate arrays (FPGA), and a programmable-logic device for performing certain operations, which are now known or will be developed in the future.

According to various embodiments, at least some of the devices (such as modules or functions thereof) or the method (such as operation) is implemented by a command stored in a computer-readable storage medium in a programming module form. When the instruction is performed by at least one processor (such as the processor 120), the at least one processor performs a function corresponding to the instruction. The computer-readable storage medium is, for example, the memory 130. At least some of the programming modules are implemented (such as executed) by, for example, the processor 120. At least some of the programming modules include, for example, a module, a program, a routine, a set of instructions or a process for performing one or more functions.

The computer-readable recording medium includes magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (such as programming module), such as a Read Only Memory (ROM), a Random Access Memory (RAM), a flash memory and the like. In addition, the program instructions include high class language codes which are executed in a computer by using an interpreter, as well as machine codes made by a compiler. The aforementioned hardware device is configured to operate as one or more software modules in order to perform the operation of the present disclosure, and vice versa.

The programming module includes one or more of the aforementioned components or further includes other additional components, or some of the aforementioned components are omitted. Operations executed by a module, a programming module, or other component elements according to various embodiments of the present disclosure are be executed sequentially, in parallel, repeatedly, or in a heuristic manner. Furthermore, some operations are executed according to another order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating an electronic device, the method comprising:
   receiving, by the electronic device that includes a display and a voice receiving device, a first speech portion of a sentence through the voice receiving device;
   while receiving a second speech portion of the sentence following the first speech portion of the sentence through the voice receiving device:
      transmitting, by the electronic device, the first speech portion to be recognized to an outside of the electronic device through a communication interface;
      receiving, by the electronic device, first information from the outside of the electronic device through the communication interface, the first information associated with a plurality of applications corresponding to a context of the first speech portion; and
      displaying, on the display of the electronic device, icons corresponding to the plurality of applications; and
   after receiving the second speech portion of the sentence:
      transmitting, by the electronic device to the outside of the electronic device, the second speech portion to be recognized, through the communication interface;
      receiving, by the electronic device, via the communication interface from the outside of the electronic device, second information, the second information associated with at least one application of the plurality of applications corresponding to the context of the first speech portion and a context of the second speech portion;
      displaying, on the display of the electronic device, at least one icon corresponding to the at least one application sorted out of the plurality of applications; and
      executing an application corresponding to the at least one icon.

2. The method of claim 1, further comprising:
   transmitting, by the electronic device, the second speech portion to the outside of the electronic device through the communication interface after transmitting the first speech portion to the outside of the electronic device through the communication interface; and
   receiving, by the electronic device, the second information from the outside of the electronic device through the communication interface after receiving the first information from the outside of the electronic device through the communication interface.

3. The method of claim 1, wherein the first speech portion is a phrase including one or more words, and does not form a complete sentence.

4. The method of claim 1, wherein the second speech portion is a phrase that includes one or more words, and does not form a complete sentence, and forms at least a part of the sentence together with the first speech portion.

5. The method of claim 1, wherein:
   the first information includes information that is generated, retrieved, or recommended based on an association with the first speech portion, and
   the second information includes information that is generated, retrieved, or recommended based on an association with at least a part of a combination of the first information and the second speech portion.

6. The method of claim 5, wherein the first information includes a map and the second information includes position information on the map.

7. The method of claim 1, further comprising:
   generating, retrieving, or recommending, by the electronic device, the first information by processing the first speech portion; and
   generating, retrieving, or recommending, by the electronic device, the second information by processing the second speech portion.

8. An electronic device, comprising:
   a display;
   a voice receiving device;
   a communication interface;
   a memory; and
   a processor, wherein:
   the memory stores instructions, which when executed by the processor, cause the electronic device to:
   receive a first speech portion of a sentence through the voice receiving device,
   while receiving a second speech portion of the sentence following the first speech portion of the sentence through the voice receiving device:
   transmit, by the electronic device, through the communication interface, the first speech portion to be recognized to an outside of the electronic device,
   receive, by the electronic device, through the communication interface, first information from the outside of the electronic device, the first information associated with a plurality of applications corresponding to a context of the first speech portion, and
   display, on the display, icons corresponding to the plurality of applications, and
   after receiving the second speech portion of the sentence:
   transmit, by the electronic device to the outside of the electronic device, through the communication interface, the second speech portion to be recognized,
   receive, by the electronic device, through the communication interface, from the outside of the electronic device, second information, the second information associated with at least one application of the plurality of applications corresponding to the context of the first speech portion and a context of the second speech portion, and
   display on the display, at least one icon corresponding to the at least one application out of the plurality of applications, and
   execute an application corresponding to the at least one icon.

9. The electronic device of claim 8, wherein the memory further stores instructions, which when executed by the processor, cause the electronic device to:
   transmit the second speech portion to the outside of the electronic device through the communication interface, after transmitting the first speech portion to the outside of the electronic device through the communication interface, and
   receive the second information from the outside of the electronic device through the communication interface, after receiving the first information from the outside of the electronic device through the communication interface.

10. The electronic device of claim 8, wherein the first speech portion includes a phrase including one or more words, and does not form a complete sentence.

11. The electronic device of claim 8, wherein the second speech portion is a phrase including one or more words, and does not form a complete sentence, and forms at least a part of a single sentence together with the first speech portion.

12. The electronic device of claim 8, wherein:
- the first information includes information that is generated, retrieved, or recommended based on an association with the first speech portion, and
- the second information includes information that is at least one of generated, retrieved, or recommended based on an association with at least a part of a combination of the first information and the second speech portion.

13. The electronic device of claim 12, wherein the first information includes a map and the second information includes position information on the map.

14. The electronic device of claim 8, wherein, the memory further stores instructions, which, when executed by the processor, cause the electronic device to:
- at least one of generating, retrieving, or recommending the first information by processing the first speech portion, and
- at least one of generating, retrieving, or recommending the second information by processing the second speech portion.

* * * * *